US012379597B2

(12) United States Patent
Lee et al.

(10) Patent No.: US 12,379,597 B2
(45) Date of Patent: Aug. 5, 2025

(54) APPARATUS FOR PROVIDING AUGMENTED REALITY AND METHOD OF PROVIDING AUGMENTED REALITY USING THE SAME

(71) Applicant: Samsung Display Co., LTD., Yongin-si (KR)

(72) Inventors: Tae Hee Lee, Hwaseong-si (KR); Min Woo Kim, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 618 days.

(21) Appl. No.: 17/736,615

(22) Filed: May 4, 2022

(65) Prior Publication Data
US 2023/0081258 A1 Mar. 16, 2023

(30) Foreign Application Priority Data
Sep. 15, 2021 (KR) .................. 10-2021-0123183

(51) Int. Cl.
*G02B 27/01* (2006.01)
(52) U.S. Cl.
CPC .. *G02B 27/0172* (2013.01); *G02B 2027/0178* (2013.01)
(58) Field of Classification Search
CPC .. G02B 27/01; G02B 27/017; G02B 27/0101; G02B 27/0172; G02B 27/0176; G02B 2027/0138; G02B 2027/0178; G06F 3/00; G06F 3/011; G06F 3/012; G06F 3/013; G06F 3/014; G06F 3/017
See application file for complete search history.

(56) References Cited

U.S. PATENT DOCUMENTS

| | | | | |
|---|---|---|---|---|
| 10,976,829 | B1* | 4/2021 | Viswanathan | G06N 20/00 |
| 2016/0187662 | A1* | 6/2016 | Sato | G02B 27/017 |
| | | | | 345/8 |
| 2017/0309698 | A1 | 10/2017 | Bower et al. | |
| 2017/0339338 | A1* | 11/2017 | Gordon | G06V 40/20 |
| 2018/0004283 | A1* | 1/2018 | Mathey-Owens | |
| | | | | G06F 3/04842 |
| 2018/0246331 | A1* | 8/2018 | Cheng | H04N 13/383 |
| 2020/0285310 | A1* | 9/2020 | Sazuka | G02B 27/0093 |

FOREIGN PATENT DOCUMENTS

| | | |
|---|---|---|
| KR | 10-1791366 B1 | 10/2017 |
| KR | 2017-0126508 A | 11/2017 |
| KR | 2018-0118488 A | 10/2018 |
| KR | 2020-0106483 A | 9/2020 |

* cited by examiner

*Primary Examiner* — Sultan Chowdhury
(74) *Attorney, Agent, or Firm* — Womble Bond Dickinson (US) LLP

(57) ABSTRACT

An apparatus for providing augmented reality (AR) includes a support frame supporting at least one transparent lens, at least one display module for displaying AR content through the at least one transparent lens, a sensing module for detecting image data from a forward direction of the support frame, and for sensing signals for changes in motion, shape, or a location of a user's hand or a location of a pointing tool, and a control module for detecting motion information of the user's hand or of the pointing tool based on the signals and the image data, for modulating the AR content to correspond to the motion information, and for providing the modulated AR content to the at least one display module.

19 Claims, 22 Drawing Sheets

FIG. 6
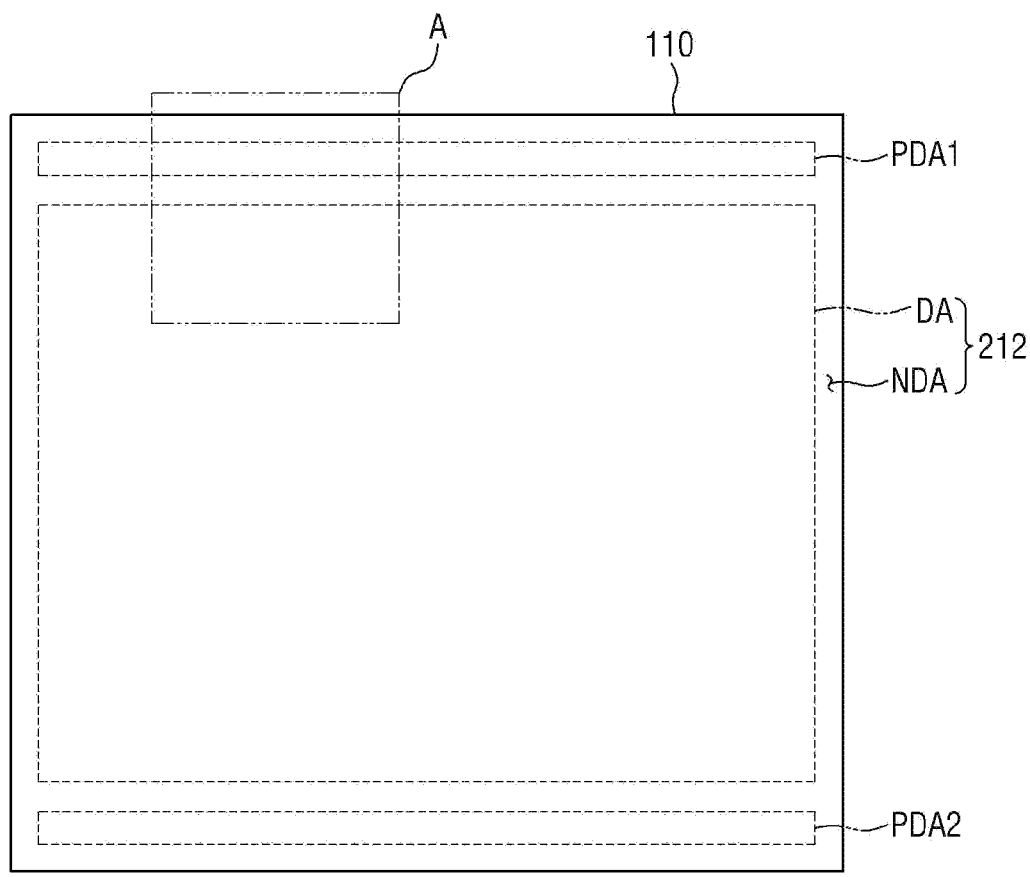
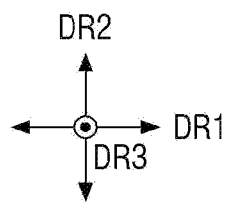

FIG. 8
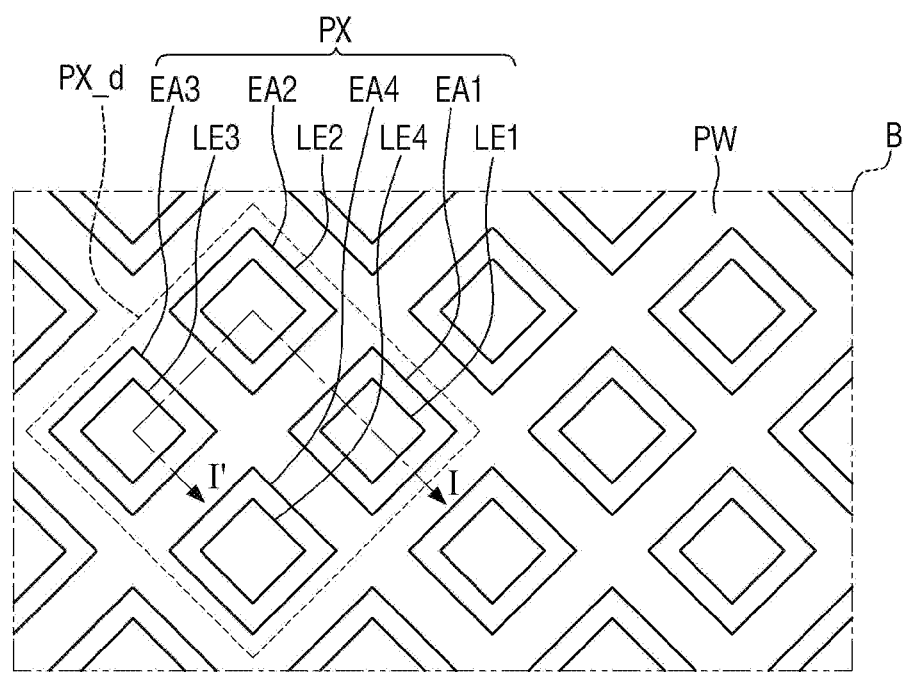
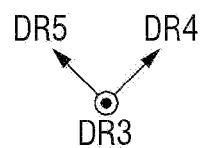

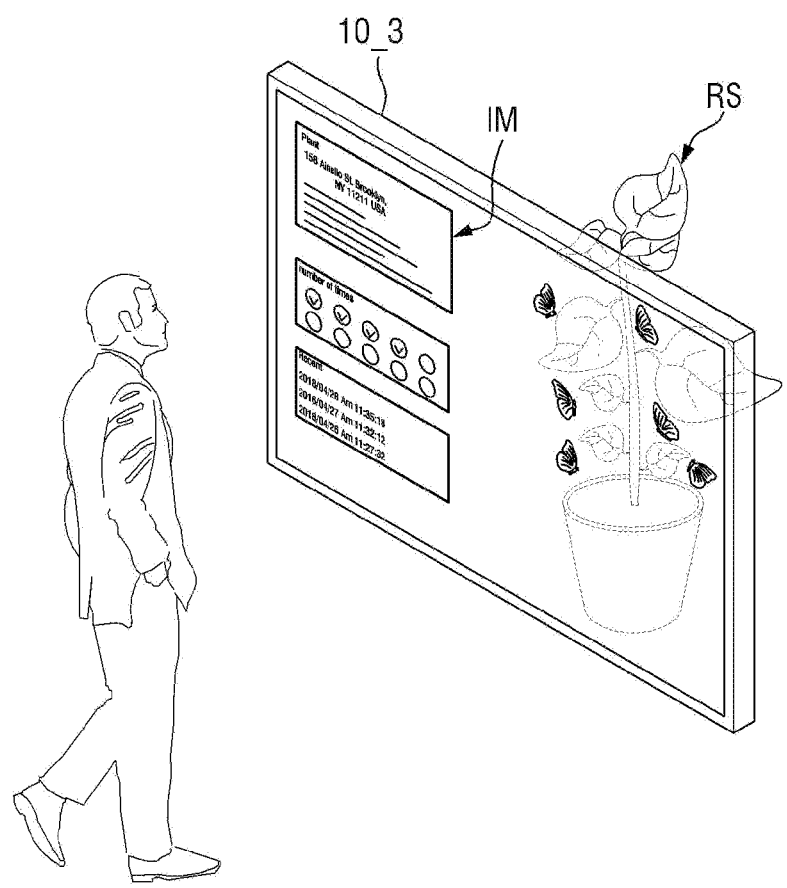

APPARATUS FOR PROVIDING AUGMENTED REALITY AND METHOD OF PROVIDING AUGMENTED REALITY USING THE SAME

CROSS-REFERENCE TO RELATED APPLICATION

This application claims priority to, and the benefit of, Korean Patent Application No. 10-2021-0123183, filed on Sep. 15, 2021, the disclosure of which is incorporated herein by reference in its entirety.

BACKGROUND

1. Field

The present disclosure relates to an apparatus for providing augmented reality (AR), and a method of providing AR using the same.

2. Description of the Related Art

Electronic devices and display devices capable of implementing virtual reality (VR) have been developed and have increasingly attracted attention. Techniques for implementing augmented reality (AR) and mixed reality (MR) as the next step for VR are being studied.

AR, unlike VR, which is based on a completely virtual world, is a display technique that can further promote the perception of vividness by superimposing virtual objects or image information on a real-world environment.

While VR has been limitedly applied to the fields of games, virtual experiences, etc., AR is applicable to the real world in various manners. For example, AR is attracting attention as a next-generation display technology suitable for a ubiquitous environment or an Internet of things (IoT) environment. AR is considered an example of MR in that it mixes and shows the real world and additional information of a virtual world.

SUMMARY

Embodiments of the present disclosure provide an apparatus for providing augmented reality (AR), which is capable of modifying and displaying display information of AR content in accordance with motion information of a hand of a user or a pointing tool, and a method of providing AR using the apparatus.

Embodiments of the present disclosure also provide an apparatus for providing AR, which is capable of precisely detecting the motion of a hand of a user or motion information of a pointing tool, and modifying and displaying display information of AR content, and a method of providing AR using the apparatus.

However, embodiments of the present disclosure are not restricted to those set forth herein. The above and other embodiments of the present disclosure will become more apparent to one of ordinary skill in the art to which the present disclosure pertains by referencing the detailed description of the present disclosure given below.

According to some embodiments of the present disclosure, an apparatus for providing augmented reality (AR) includes a support frame supporting at least one transparent lens, at least one display module for displaying AR content through the at least one transparent lens, a sensing module for detecting image data from a forward direction of the support frame, and for sensing signals for changes in motion, shape, or a location of a user's hand or a location of a pointing tool, and a control module for detecting motion information of the user's hand or of the pointing tool based on the signals and the image data, for modulating the AR content to correspond to the motion information, and for providing the modulated AR content to the at least one display module.

The at least one display module may be assembled to at least one side of the support frame, or integrally formed with the support frame, and is configured to display an image of the AR content through an image transmitting member and reflective members of the at least one transparent lens.

The sensing module may be assembled to, or integrally formed with, the support frame, is configured to detect the signals and image data including the user's hand or the pointing tool with a depth sensor or an image sensor, and is configured to detect the user's eyeballs or pupils with first or second biometric sensors.

The control module may be configured to generate coordinate information of the user's hand or the pointing tool by dividing front-direction image data of the sensing module into a plurality of block regions, detecting coordinates of the user's gaze direction based on a result of analyzing pupil sensing signals via the first or second biometric sensors, and detecting the user's hand or the pointing tool from an image of a block region corresponding to the coordinates of the user's gaze direction.

In response to the user's hand or the pointing tool being detected from the image of one of the block regions corresponding to the coordinates of the user's gaze direction, the control module may be configured to continuously detect the motion information, which includes X-axis, Y-axis, and Z-axis coordinate information, in accordance with changes in the location and the shape of the user's hand, may be configured to generate moving path data by connecting the X-axis, Y-axis, and Z-axis coordinate information, and may be configured to modulate data of the AR content by matching the coordinates of the user's hand or the pointing tool, included in the moving path data, with image objects of an image of the AR content.

The control module may be configured to modulate a general image of the AR content or display characteristic data of the image objects to correspond to changes in the coordinates of the user's hand or the pointing tool, and may be configured to transmit the image or the display characteristic data to the at least one display module and at least one external content display device.

The control module may include a sensing signal detection unit, which is configured to receive the signals and pupil sensing signals from the sensing module, is configured to preprocess the signals and the pupil sensing signals, and is configured to align and sequentially output the image data in units of one or more frames or horizontal lines, a sensing signal analysis unit, which is configured to divide the image data into block regions, and is configured to generate moving path data by connecting X-axis, Y-axis, and Z-axis coordinate information of the user's hand or the pointing tool in response to the user's hand or the pointing tool being detected from images of the block regions, a sensing location matching unit, which is configured to match X-axis, Y-axis, and Z-axis coordinate information of the user's hand or the pointing tool, included in the moving path data, with image objects of an image of the AR content, and a content modulation unit, which is configured to modulate a general image of the AR content or display characteristic data of the image objects to correspond to changes in the X-axis, Y-axis, and Z-axis coordinate information of the user's hand or the pointing tool.

The sensing signal analysis unit may be configured to divide front-direction image data of the sensing module into a plurality of predefined block regions, may be configured to detect coordinates of the user's gaze direction based on matrix layout information of infrared (IR) sensors included in the sensing module and a result of analyzing movement of pupil sensing signals from infrared (IR) sensors with reference to the matrix layout information, and may be configured to detect X-axis, Y-axis, and Z-axis coordinate information of the user's hand or the pointing tool by detecting the user's hand or the pointing tool from an image of a block region corresponding to the coordinates of the user's gaze direction.

The sensing signal analysis unit may be configured to detect an image of the user's hand or the pointing tool based on at least one of a result of analyzing differences in grayscale or luminance between pixels of the block region corresponding to the coordinates of the user's gaze direction and a result of analyzing pixel data of the block region corresponding to the coordinates of the user's gaze direction and a mask having the shape of the user's hand or the pointing tool.

The sensing signal analysis unit may be configured to generate moving path data of the user's hand or the pointing tool by continuously storing the X-axis, Y-axis, and Z-axis coordinate information of the user's hand or the pointing tool in coordinate space data or block data having a size of the AR content.

The at least one display module may include at least one image display device, which is configured to display an image of the AR content, and an image transmitting member, which is configured to transmit the image of the AR content to the at least one transparent lens, wherein the image transmitting member includes at least one optical member including an optical waveguide, a diffusion lens, or a focusing lens.

The at least one image display device may include a partition wall, which is defined and arranged on a substrate in a RGB matrix structure, light-emitting elements in respective emission areas, defined in the RGB matrix structure by the partition wall, and extending in a thickness direction of the substrate, a base resin in the emission areas, and optical patterns in at least one of the emission areas.

The emission areas may include first through third emission areas, or first through fourth emission areas, in each pixel region in the RGB matrix structure.

The first emission area may include a first light-emitting element for emitting a first light of red, green, or blue, wherein the second emission area includes a second light-emitting element for emitting second light of red, green, or blue and different from the first light, wherein the third emission area includes a third light-emitting element for emitting third light of red, green, or blue, and different from the first light and the second light, and wherein the fourth emission area includes a fourth light-emitting element for emitting fourth light that is the same as one of the first light, the second light, or the third light.

The first through fourth emission areas may have a same size or planar area, wherein respective distances, in a horizontal direction or a diagonal direction, between the first and second emission areas, between the second and third emission areas, between the first and third emission areas, and between the third and fourth emission areas are the same.

The first through fourth emission areas may have different respective sizes or planar areas, wherein respective distances, in a horizontal direction or a diagonal direction, between the first and second emission areas, between the second and third emission areas, between the first and third emission areas, and between the third and fourth emission areas are the same or different depending on a size or a planar area of the first through fourth emission areas.

According to some embodiments of the present disclosure, a method of providing augmented reality (AR) includes displaying AR content via at least one display module and at least one transparent lens, detecting image data from a forward direction of a support frame, sensing signals for changes in motion, shape, or location of a user's hand or of a pointing tool, detecting motion information of the user's hand or the pointing tool based on the signals and the image data, modulating the AR content to correspond to the motion information, providing the AR content to the at least one display module, and transmitting the AR content to at least one external content display device.

The modulating the AR content to correspond to the motion information may include dividing the image data into block regions, generating moving path data by connecting X-axis, Y-axis, and Z-axis coordinate information of the user's hand or the pointing tool in response to the user's hand or the pointing tool being detected from images of the block regions, matching X-axis, Y-axis, and Z-axis coordinate information of the user's hand or the pointing tool, included in the moving path data, and image objects of an image of the AR content, and modulating a general image of the AR content or display characteristic data of the image objects to correspond to changes in the X-axis, Y-axis, and Z-axis coordinate information of the user's hand or the pointing tool.

The detecting the user's hand or the pointing tool from the images of the block regions may include detecting an image of the user's hand or the pointing tool based on at least one of a result of analyzing differences in grayscale or luminance between pixels of a block region corresponding to the coordinates of the user's gaze direction and a result of analyzing pixel data of the block region corresponding to the coordinates of the user's gaze direction and a mask having the shape of the user's hand or the pointing tool.

The generating the moving path data may include generating moving path data of the user's hand or the pointing tool by storing the X-axis, Y-axis, and Z-axis coordinate information of the user's hand or the pointing tool in coordinate space data or block data having a size of the AR content.

According to the aforementioned and other embodiments of the present disclosure, the satisfaction of use of an apparatus for providing AR content may be improved by allowing display information of AR content to be suitably modified and displayed.

Also, the utility and reliability of an apparatus for providing AR content may be improved by allowing AR content to be modulated and displayed with various types of motions.

Other aspects and embodiments may be apparent from the following detailed description, the drawings, and the claims.

BRIEF DESCRIPTION OF THE DRAWINGS

The above and other embodiments and aspects of the present disclosure will become more apparent by describing in detail embodiments thereof with reference to the attached drawings, in which:

FIG. 6 is a layout view of an image display device of FIG. 5;

FIG. 8 is a layout view of pixels in an area B of FIG. 7;

FIG. 22 is a transparent display device including a display module according to some embodiments of the present disclosure.

DETAILED DESCRIPTION

Figure 1:
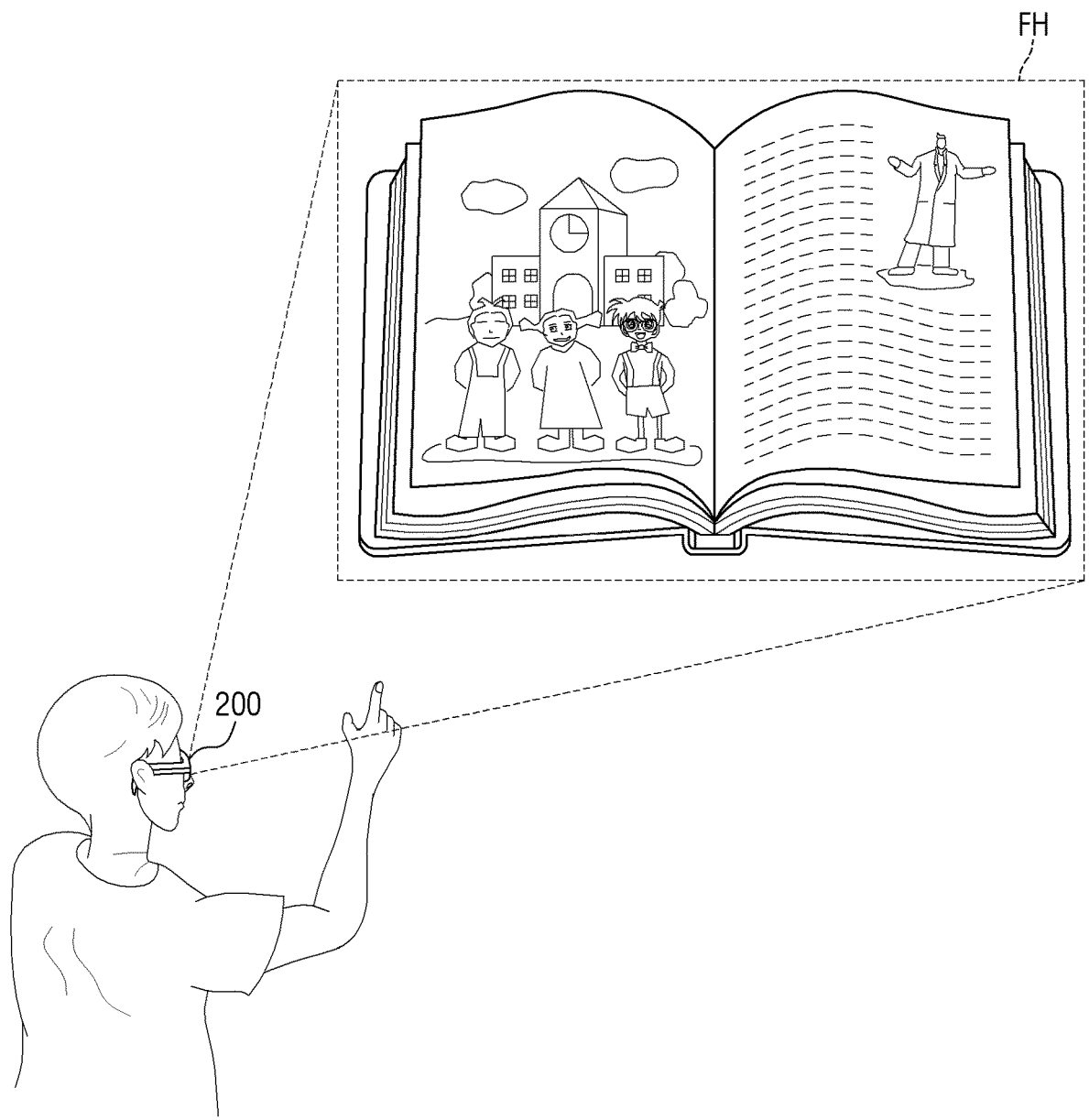
FIG. 1 illustrates an apparatus for providing augmented reality (AR) according to some embodiments of the present disclosure.

Aspects of some embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may have various modifications and may be embodied in various different forms, and should not be construed as being limited to only the illustrated embodiments herein. Rather, these embodiments are provided as examples so that this disclosure will be thorough and complete, and will fully convey the aspects of the present disclosure to those skilled in the art, and it should be understood that the present disclosure covers all the modifications, equivalents, and replacements within the idea and technical scope of the present disclosure. Accordingly, processes, elements, and techniques that are not necessary to those having ordinary skill in the art for a complete understanding of the aspects of the present disclosure may not be described.

Unless otherwise noted, like reference numerals, characters, or combinations thereof denote like elements throughout the attached drawings and the written description, and thus, descriptions thereof will not be repeated. Further, parts that are not related to, or that are irrelevant to, the description of the embodiments might not be shown to make the description clear.

In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, in this specification, the phrase "on a plane," or "plan view," means viewing a target portion from the top, and the phrase "on a cross-section" means viewing a cross-section formed by vertically cutting a target portion from the side.

It will be understood that when an element, layer, region, or component is referred to as being "formed on," "on," "connected to," or "coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled," or "directly on," refers to one component directly connecting or coupling another component, or being on another component, without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," when preceding a list of elements, modify the entire list of elements and do not modify the individual elements of the list. For example, "at least one of X, Y, and Z," "at least one of X, Y, or Z," and "at least one selected from the group consisting of X, Y, and Z" may be construed as X only, Y only, Z only, any combination of two or more of X, Y, and Z, such as, for instance, XYZ, XYY, YZ, and ZZ, or any variation thereof. Similarly, the expression such as "at least one of A and B" may include A, B, or A and B. As used herein, "or" generally means "and/or," and the term "and/or" includes any and all combinations of one or more of the associated listed items. For example, the expression such as "A and/or B" may include A, B, or A and B.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

When one or more embodiments may be implemented differently, a specific process order may be performed differently from the described order. For example, two consecutively described processes may be performed substantially at the same time or performed in an order opposite to the described order.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

The electronic or electric devices and/or any other relevant devices or components according to embodiments of the present disclosure described herein may be implemented utilizing any suitable hardware, firmware (e.g., an application-specific integrated circuit), software, or a combination of software, firmware, and hardware, to process data or digital signals. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Circuit hardware may include, for example, application specific integrated circuits (ASICs), general purpose or special purpose central processing units (CPUs) that is configured to execute instructions stored in a non-transitory storage medium, digital signal processors (DSPs), graphics processing units (GPUs), and programmable logic devices such as field programmable gate arrays (FPGAs).

Further, the various components of these devices may be a process or thread, running on one or more processors, in one or more computing devices, executing computer program instructions and interacting with other system components for performing the various functionalities described herein. The computer program instructions are stored in a memory that may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Each of the aspects of the various embodiments of the present disclosure may be combined or combined with each other, in part or in whole, and technically various interlocking and driving are possible. Each embodiment may be implemented independently of each other or may be implemented together in an association.

FIG. 1 illustrates an apparatus for providing augmented reality (AR) according to some embodiments of the present disclosure.

Referring to FIG. 1, an apparatus 200 for providing AR detects not only motion information of a hand of a user (e.g., the motion, shape, and location of the user's hand), but also motion information of a pointing tool, such as a writing instrument, an electronic pen, or a laser pointer, and modifies and displays display information of AR content to correspond to the detected motion information. For example, the apparatus 200 may modify and display the image and sound of AR content to correspond to the detected motion information. Here, modifications made to the image and the sound of the AR content may also be displayed by another content displaying device, such as a tablet personal computer (PC) or a smartphone.

The apparatus 200 may be integrally formed with a glasses frame to be suitably carried around and worn by the user, or may be configured to be mounted or assembled to the glasses frame. The apparatus 200 provides an image FH of the AR content through transparent lenses such that the AR content image FH may be superimposed on a real-world image seen by the eyes of the user through the transparent lenses. Here, the AR content may include two- or three-dimensional (2D or 3D) image content, combined with graphic images, captured images, text, and the like, and also sound content.

The apparatus 200 may include at least one display module for displaying the AR content image FH, and may further include optical members for changing a display path (or an optical path) for the AR content image FH, which is displayed by the display module, such that the AR content image FH may become recognizable to the eyes of the user.

The apparatus 200 detects motion information of the user's hand in real time while the AR content image FH is being displayed, but the present disclosure is not limited thereto. As already mentioned above, the apparatus 200 may also detect motion information of a pointing tool. However, for convenience, the apparatus 200 will hereinafter be described as detecting motion information of the user's hand.

To precisely detect motion information of the user's hand, such as the motion and the location of the user's hand, the apparatus 200 may detect motion information in at least three axial directions (e.g., X-axis, Y-axis, and Z-axis directions). Here, the X-axis, Y-axis, and Z-axis directions may refer to a horizontal axis direction, a vertical axis direction, and a depth (or distance) axis direction. In response to motion information such as a change in the location of the user's hand being detected, the apparatus 200 matches image objects of the AR content image FH in accordance with coordinate information of the user's hand. Then, the apparatus 200 modifies the general image characteristics or the sizes, locations, colors, and motion characteristics of the matched image objects to correspond to the motion of the user's hand, such as the location, the moving direction, the moving distance, and/or the shape of the user's hand. The apparatus 200 may also modify other data, such as sound in accordance with modifications made to the image characteristics and/or the motion characteristics of the matched image objects. AR content modified in accordance with the motion information of the user's hand may be displayed in real time via the display module of the apparatus 200. Also, the apparatus 200 may transmit/share the modified AR content to/with at least one content displaying device, which is an external device, such that the modified AR content may also be displayed by the at least one external content displaying device.

Figure 2:
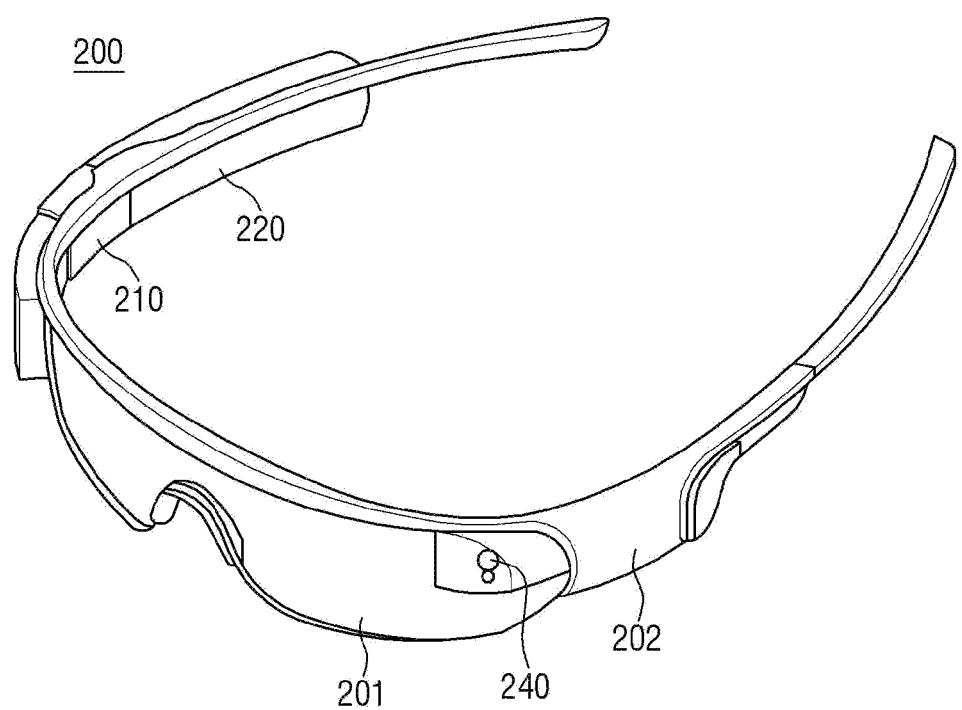
FIG. 2 is a perspective view of the apparatus of FIG. 1.
Figure 3:
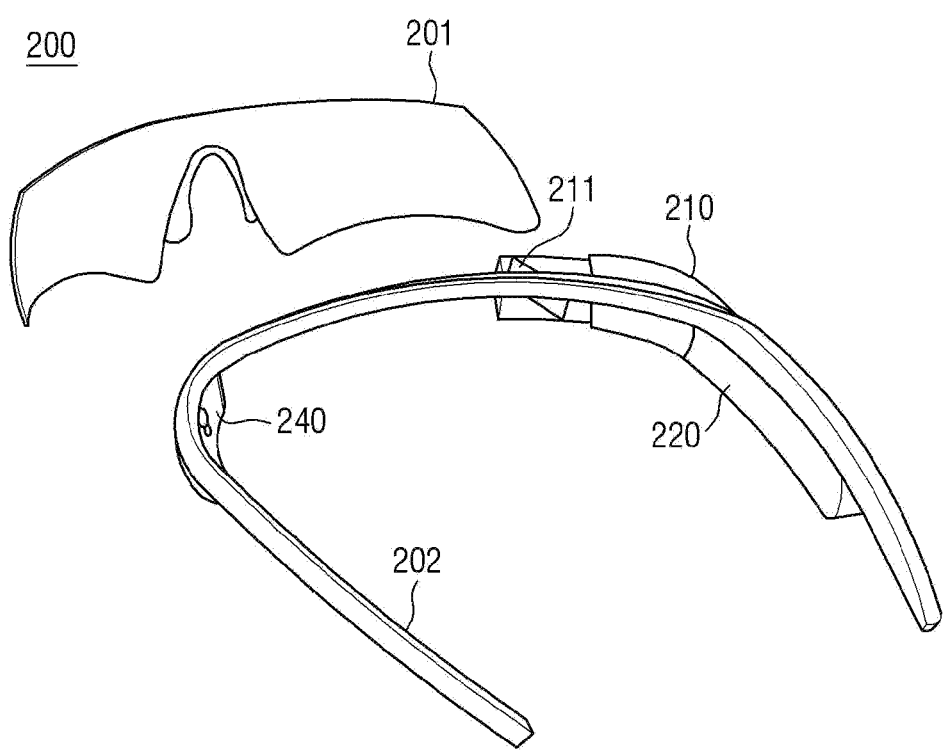
FIG. 3 is a rear exploded perspective view of the apparatus of FIG. 2.
Figure 4:
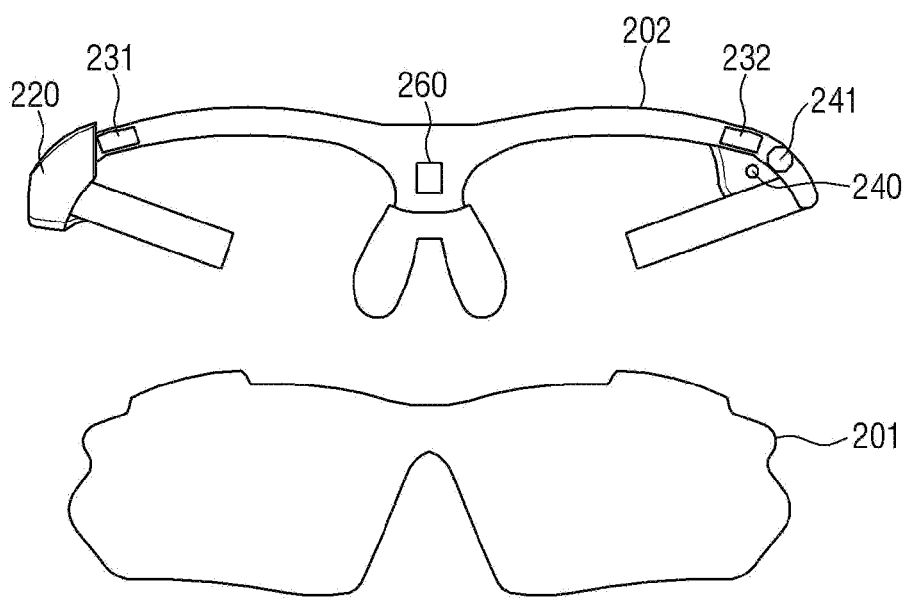
FIG. 4 is a front perspective view of the apparatus of FIGS. 2 and 3.

FIG. 2 is a perspective view of the apparatus of FIG. 1. FIG. 3 is a rear exploded perspective view of the apparatus of FIG. 2. FIG. 4 is a front perspective view of the apparatus of FIGS. 2 and 3.

Referring to FIGS. 2 through 4, the apparatus 200 includes a support frame 202, which supports at least one transparent lens 201, at least one display module 210, a sensing module 240, and a control module 220.

The support frame 202 may be formed as an eyewear form including an eyeglass frame, which supports the edge of the transparent lens 201, and temples. The shape of the support frame 202 is not particularly limited, and the support frame 202 may be formed as a pair of goggles including the transparent lens 201 or a head-mounted display (HMD).

The transparent lens 201 may be formed in one body or may consist of first and second transparent lenses, which are separate. The transparent lens 201 may be formed of glass or plastic to be transparent or semitransparent. As a result, the user may be able to see an image of the real world through the transparent lens 201. The transparent lens 201 may have refractive power in consideration of the user's eyesight.

At least one reflective member for reflecting the AR content image FH, which is provided by the display module 210, toward the user's eyes and optical members for controlling the focus and size of the AR content image FH may be included in the transparent lens 201. The reflective member may be embedded in the transparent lens 201, and may be formed as a plurality of refractive lenses or prisms having a curvature (e.g., a predetermined curvature).

The display module 210 may include a micro-light-emitting diode (micro-LED) display device, a nano-light-emitting diode (nano-LED) display device, an organic light-emitting diode (OLED) display device, an inorganic electroluminescent (EL) display device, a quantum-dot light-emitting diode (QED) display device, a cathode ray tube (CRT) display device, or a liquid crystal display (LCD) device. The display module 210 will hereinafter be described as including a micro-LED display device, and a micro-LED display device will hereinafter be abbreviated simply as a display device. However, the present disclosure is not limited to this. That is, various display devices other than a micro-LED display device may also be applicable to the display module 210.

The sensing module 240 may be assembled into, or integrally formed with, the support frame 202 to sense the distance (or depth) of an object in front of the support frame 202, the intensity of illumination, and the moving direction, moving distance, and slope of the support frame 202. To this end, the sensing module 240 may include a depth sensor 241, such as an infrared sensor or a laser imaging, detection, and ranging (LIDAR) sensor, and may include an image sensor 260 such as a camera. The sensing module 240 may further include at least one motion sensor such as an illumination sensor, a human body detection sensor, a gyro sensor, a tilt sensor, or an acceleration sensor. The sensing module 240 may further include first and second biometric sensors 231 and 232 for detecting the movement of the user's eyeballs or pupils.

The first and second biometric sensors 231 and 232 may be located on the inside of the support frame 202 to face the user's eyes, and may include at least one infrared (IR) light source and at least one IR camera. The IR light source outputs IR light, and the IR camera detects IR light reflected from a subject such as the user's eyeballs or pupils. The IR light source may be implemented as an array of IR light-emitting diodes (LEDs) that are arranged in a matrix. The IR camera may include a filter capable of transmitting IR light therethrough, while blocking other wavelength ranges, may include a lens system for focusing IR light transmitted therethrough by the filter, and may include an optical image sensor for converting an optical image formed by the lens system into an electric image signal, and for outputting the image signal. The optical image sensor may be implemented as an array of image sensors that are arranged in a matrix.

The sensing module 240 may transmit sensing signals generated by the depth sensor 241 and the motion sensor to the control module 220 in real time. The image sensor 260 transmits image data generated in real time in units of one or more frames to the control module 220. The first and second biometric sensors 231 and 232 of the sensing module 240 transmit pupil sensing signals to the control module 220.

The control module 220 may be assembled to at least one side of, or integrally formed with, the support frame 202, together with the display module 210. The control module 220 provides AR content to the display module 210 such that the display module 210 displays the AR content (or the AR content image FH). Furthermore, the control module 220 receives sensing signals, image data, and pupil sensing signals from the sensing module 240.

The control module 220 detects motion information of the apparatus 200 from the sensing signals from the sensing module 240 and from the image data from the image sensor 260, and secures and stores front-direction image data. The control module 220 detects the coordinates of the user's gaze direction based on changes in the pupil sensing signals and the result of the analysis of the pupil sensing signals. Accordingly, the control module 220 may detect the user's hand or a pointing tool by dividing the front-direction image data of the apparatus 200 into a plurality of block regions, and by analyzing a block region corresponding to the coordinates of the user's gaze direction.

In response to the user's hand or the pointing tool being detected from the block region corresponding to the coordinates of the user's gaze direction, the control module 220 continuously calculates coordinate information for the three axial directions (e.g., the X-axis, Y-axis, and Z-axis directions) in real time in accordance with changes in the location and shape of the user's hand, and detects motion information by connecting and tracking the coordinate information. Then, the control module 220 modifies the general image of the AR content, or the display characteristic data of image objects of the image of the AR content, in accordance with changes in the coordinates of the user's hand by matching the coordinate information of the user's hand and the image objects. Also, the control module 220 modifies other related data, such as sound data, in accordance with the modifications made to the entire image of the AR content or made to the image objects of the image of the AR content.

Figure 5:
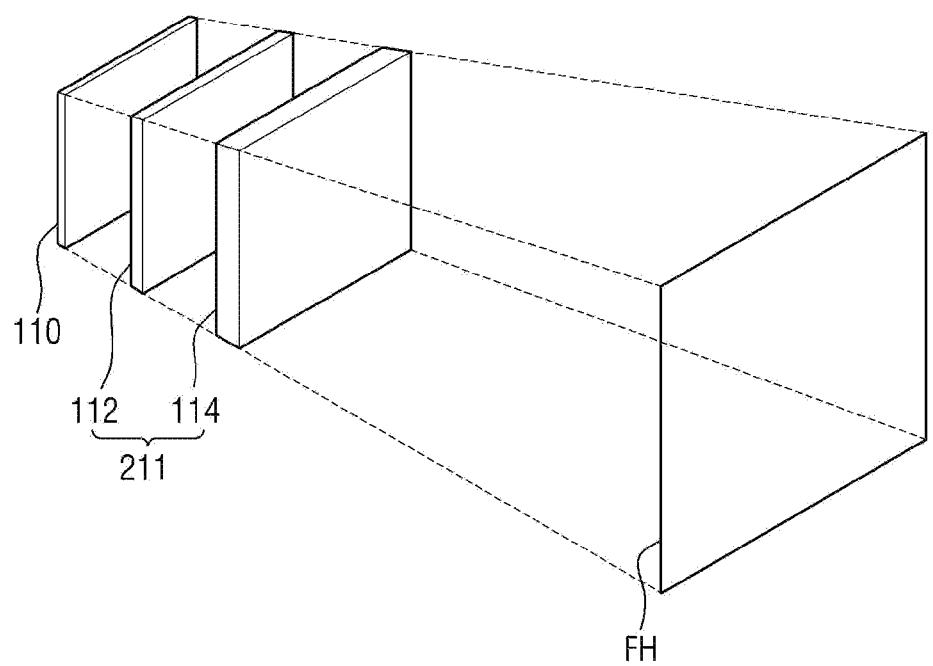
FIG. 5 is a perspective view of a display module of the apparatus of FIGS. 2 through 4.

FIG. 5 is a perspective view of the display module of the apparatus of FIGS. 2 through 4.

Referring to FIGS. 2 through 5, the display module 210, which displays the AR content image FH, may be assembled to one or both sides of the support frame 202, or may be integrally formed with the support frame 202.

The display module 210 displays the AR content image FH over the transparent lens 201 such that the AR content image FH may be superimposed on an image of the real world seen by the user through the transparent lens 201. To this end, the display module 210 includes at least one image display device 110, which displays the AR content image FH, and an image transmitting member 211, which transmits the AR content image FH to the transparent lens 201. The image transmitting member 211 may include at least one optical member, such as an optical waveguide (e.g., a prism), a diffusion lens 112, and/or a focusing lens 114. The AR content image FH displayed via the image display device 110 may be provided to the transparent lens 201 and the user's eyes through the optical waveguide, the diffusion lens 112, and the focusing lens 114.

The image display device 110 of the display module 210 may include a micro-LED display device, a nano-LED display device, an OLED display device, an inorganic EL display device, a QED display device, a CRT display device, or an LCD device. The image display device 110 will hereinafter be described as including a micro-LED display device, but the present disclosure is not limited thereto. That is, various display devices other than a micro-LED display device may also be applicable to the image display device 110.

Figure 7:
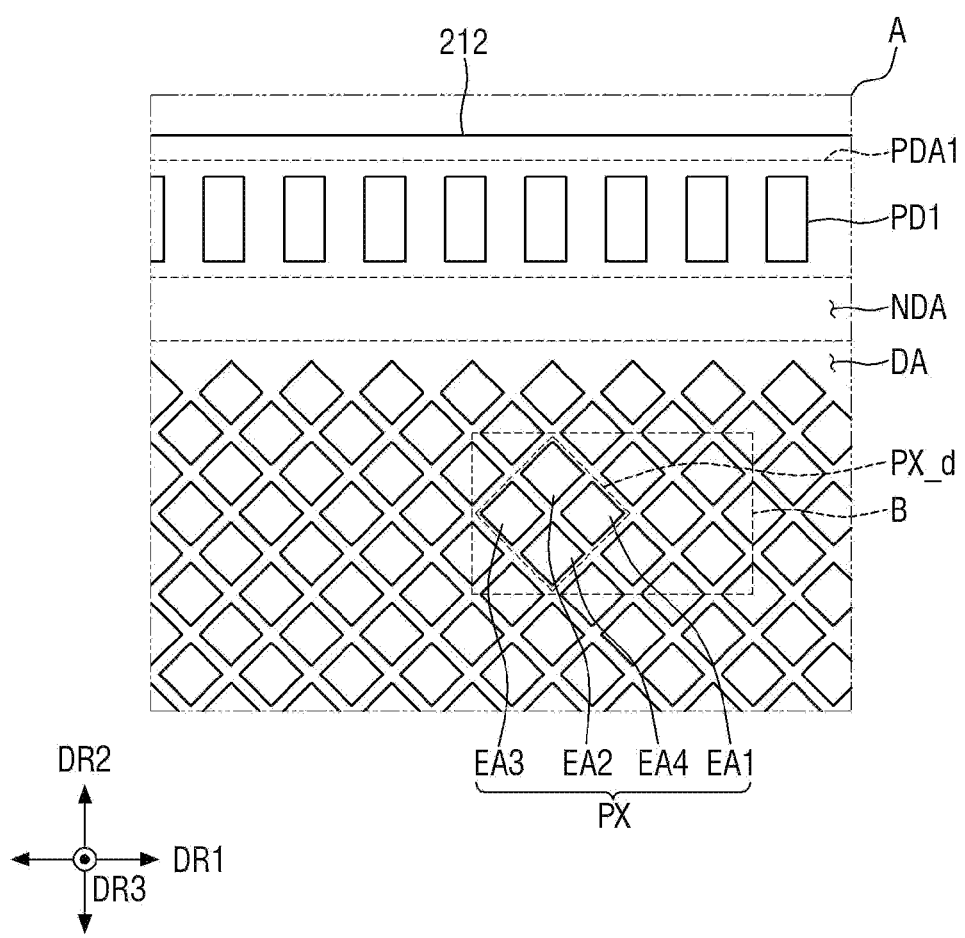
FIG. 7 is a layout view of an area A of FIG. 6.

FIG. 6 is a layout view of the image display device of FIG. 5. FIG. 7 is a layout view of an area A of FIG. 6. FIG. 8 is a layout view of pixels in an area B of FIG. 7.

Referring to FIGS. 6 through 8, the image display device 110 may have an LED-on-Silicon (LEDoS) structure, wherein LEDs are located on a semiconductor circuit substrate obtained by a semiconductor process, although the present disclosure is not limited thereto. The image display device 110 will hereinafter be described as being a micro- or nano-LED display device, or as a module including micro- or nano-LEDs, but the present disclosure is not limited thereto.

A first direction DR1 refers to the horizontal direction of the image display device 110, a second direction DR2 refers to the vertical direction of the image display device 110, a third direction DR3 refers to the thickness direction of a display panel 212 or a semiconductor circuit substrate 215, a fourth direction DR4 refers to a diagonal direction of the display panel 212, and a fifth direction DR5 refers to a diagonal direction intersecting the fourth direction DR4. The terms "left", "right", "upper", and "lower", as used herein, refer to their respective directions as viewed from above. For example, the term "right side" may refer to a first side in the first direction DR1, the term "left side" may refer to the other side in the first direction DR1, the term "upper side" may refer to a first side in the second direction DR2, the term "lower side" may refer to a second side in the second direction DR2, the term "top" may refer to a first side in the third direction DR3, and the term "bottom" may refer to a second side in the third direction DR3.

The image display device 110 includes the display panel 212, and the display panel 212 includes a display area DA and a non-display area NDA.

The display panel 212 of the image display device 110 may have a rectangular shape having long sides in the first direction DR1 and short sides in the second direction DR2, in a plan view, but the present disclosure is not limited thereto. Alternatively, the display panel 212 may have a non-tetragonal polygonal shape, a circular shape, an elliptical shape, or an amorphous shape in a plan view.

The display area DA may be a region where an image is displayed, and the non-display area NDA may be a region where no image is displayed. The planar shape of the display area DA may conform to the planar shape of the display panel 212. FIG. 6 illustrates that the display area DA has a rectangular shape in a plan view. The display area DA may be located in the middle of the display panel 212. The non-display area NDA may be located around the display area DA. The non-display area NDA may be located to surround the display area DA (e.g., in plan view).

A first pad unit PDA1 may be located in the non-display area NDA. The first pad unit PDA1 may be located on the upper side of the display panel 212. The first pad unit PDA1 may include first pads PD1, which are connected to an external circuit board. A second pad unit PDA2 may be located in the non-display area NDA. The second pad unit PDA2 may be located on the lower side of the display panel 212.

The second pad unit PDA2 may include second pads for connecting the display panel 212 to an external circuit board. The second pad unit PDA2 may be omitted in other embodiments.

The display area DA of the display panel 212 may include a plurality of pixels PX. The pixels PX may be defined as minimal emission units capable of displaying white light in their respective pixel regions PX_d.

Each of the pixels PX may include a plurality of emission areas. Each of the pixels PX is illustrated as having four emission areas (e.g., first through fourth emission areas EA1 through EA4) arranged in a PENTILE™ matrix (e.g., a RGBG matrix structure, a PENTILE™ matrix structure, a PENTILE™ structure, or an RGBG structure, PENTILE™ being a registered trademark of Samsung Display Co., Ltd., Republic of Korea), but the present disclosure is not limited thereto. Alternatively, in other embodiments, each of the pixels PX may include only three emission areas (e.g., first, second, and third emission areas EA1, EA2, and EA3).

In each of the pixel regions PX_d, the first through fourth emission areas EA1 through EA4 may be defined and separated by a partition wall PW. The partition wall PW may be located to surround first through fourth light-emitting elements LE1 through LE4, which are located in the first through fourth emission areas EA1 through EA4, respectively. The partition wall PW may be spaced apart from each of the first through fourth light-emitting elements LE1 through LE4. The partition wall PW may have a mesh form, a fishnet form, or a lattice form in a plan view.

FIGS. 7 and 8 illustrate that the first through fourth emission areas EA1 through EA4 have a rhombus shape in a plan view to form a PENTILE™ matrix, but the present disclosure is not limited thereto. Alternatively, the first through fourth emission areas EA1 through EA4, defined by the partition wall PW, may have a tetragonal shape other than a rhombus shape, a non-tetragonal polygonal shape (e.g., a triangular shape), a circular shape, an elliptical shape, or an amorphous shape in a plan view.

Referring to FIG. 8, the first through fourth emission areas EA1 through EA4 may include the first through fourth light-emitting elements LE1 through LE4, respectively, which emit first light, second light, third light, and fourth light, respectively. The first light may be light of a wavelength range that realizes one of red, green, and blue. The second light may be light of a wavelength range that realizes one of red, green, and blue that is also different from the color of the first light. The third light may be light of a wavelength range that realizes one of red, green, and blue that is also different from the colors of the first light and the second light. The fourth light may be light of the same wavelength range as one of the first light, the second light, and the third light.

The first through fourth light-emitting elements LE1 through LE4, which are included in the first through fourth emission areas EA1 through EA4, respectively, that are arranged in a PENTILE™ matrix, are illustrated as having a rhombus shape in a plan view, but the present disclosure is not limited thereto. Alternatively, the first through fourth emission areas EA1 though EA4 may have a polygonal shape (e.g., a triangular or rectangular shape) other than a rhombus shape, a circular shape, an elliptical shape, or an amorphous shape in a plan view.

The first emission area EA1 may refer to a region that emits the first light. The first emission area EA1 outputs the first light emitted by the first light-emitting element LE1. As already mentioned above, the first light may be light of a wavelength range that realizes one of red, green, and blue. For example, the first light may be light of a red wavelength range. The red wavelength range may be about 600 nm to about 750 nm, but the present disclosure is not limited thereto.

The second emission area EA2 may refer to a region that emits the second light. The second emission area EA2 outputs the second light emitted by the second light-emitting element LE2. As already mentioned above, the second light may be light of a wavelength range that realizes one of red, green, and blue that is different from the color of the first light. For example, the second light may be light of the blue wavelength range. The blue wavelength range may be about 370 nm to about 460 nm, but the present disclosure is not limited thereto.

The third emission area EA3 may refer to a region that emits the third light. The third emission area EA3 outputs the third light emitted by the third light-emitting element LE3. As already mentioned above, the third light may be light of a wavelength range that realizes one of red, green, and blue that is different from the colors of the first light and the second light. For example, the third light may be light of the green wavelength range. The green wavelength range may be about 480 nm to about 560 nm, but the present disclosure is not limited thereto.

The fourth emission area EA4 may refer to a region that emits the fourth light. The fourth emission area EA4 outputs the fourth light emitted by the fourth light-emitting element LE4. The fourth light may be light of a wavelength range that realizes the same color as one of the first light, the second light, and the third light. For example, the fourth light may be light of the blue wavelength range, like the second light, or may be light of the green wavelength range, like the third light, but the present disclosure is not limited thereto.

Second emission areas EA2 and fourth emission areas EA4 of the pixels PX may be alternately arranged in a vertical (or column) direction (e.g., in the second direction DR2). First emission areas EA1 and third emission areas EA3 of the pixels PX may be alternately arranged in the horizontal (or row) direction (e.g., in the first direction DR1).

The first emission areas EA1 and the fourth emission areas EA4 may be alternately arranged in a first diagonal direction (e.g., in the fourth direction DR4), and the second emission areas EA2 and the third emission areas EA3 may also be alternately arranged in the first diagonal direction (e.g., in the fourth direction DR4). On the contrary, the first emission areas EA1 and the second emission areas EA2 may be alternately arranged in a second diagonal direction (e.g., in the fifth direction DR5), and the third emission areas EA3 and the fourth emission areas EA4 may also be alternately arranged in the second diagonal direction (e.g., in the fifth direction DR5). Thus, the pixels PX may be arranged in a PENTILE™ matrix.

The first emission areas EA1, the second emission areas EA2, the third emission areas EA3, and the fourth emission areas EA4 may have the same planar size or different respective planar sizes. Similarly, first light-emitting elements LE1, second light-emitting elements LE2, third light-emitting elements LE3, and fourth light-emitting elements LE4, which are formed in the first emission areas EA1, the second emission areas EA2, the third emission areas EA3, and the fourth emission areas EA4, respectively, may have the same planar size or different respective planar sizes.

For example, the first emission areas EA1, the second emission areas EA2, the third emission areas EA3, and the fourth emission areas EA4 may all have substantially the same size, but the present disclosure is not limited thereto. Alternatively, the first emission areas EA1 and the second emission areas EA2 may have different respective sizes, the second emission areas EA2 and the third emission areas EA3 may have different respective sizes, and the third emission areas EA3 and the fourth emission areas EA4 may have different respective sizes. At least two of the first through fourth emission areas EA1 through EA4 of each of the pixels PX may have the same size.

The distance between first and second emission areas EA1 and EA2 of a pair of pixels PX adjacent to each other in the horizontal direction, or in the first or second diagonal direction, the distance between second and third emission areas EA2 and EA3 of a pair of pixels PX adjacent to each other in the horizontal direction, or in the first or second diagonal direction, the distance between third and fourth emission areas EA3 and EA4 of a pair of pixels PX adjacent to each other in the horizontal direction, or in the first or second diagonal direction, and the distance between first and fourth emission areas EA1 and EA4 of a pair of pixels PX adjacent to each other in the horizontal direction, or in the first or second diagonal direction, may all be the same or may differ, but the present disclosure is not limited thereto.

The first emission areas EA1 may emit the first light, the second emission areas EA2 may emit the second light, the third emission areas EA3 may emit the third light, and the fourth emission areas EA4 may emit one of the first light, the second light, and the third light. However, the present disclosure is not limited to this. At least one of the first through fourth emission areas EA1 through EA4 of each of the pixels PX may emit fifth light, and the fifth light may be light of a yellow wavelength range. That is, the fifth light may have a main peak wavelength of about 550 nm to about 600 nm, but the present disclosure is not limited thereto.

Figure 9:
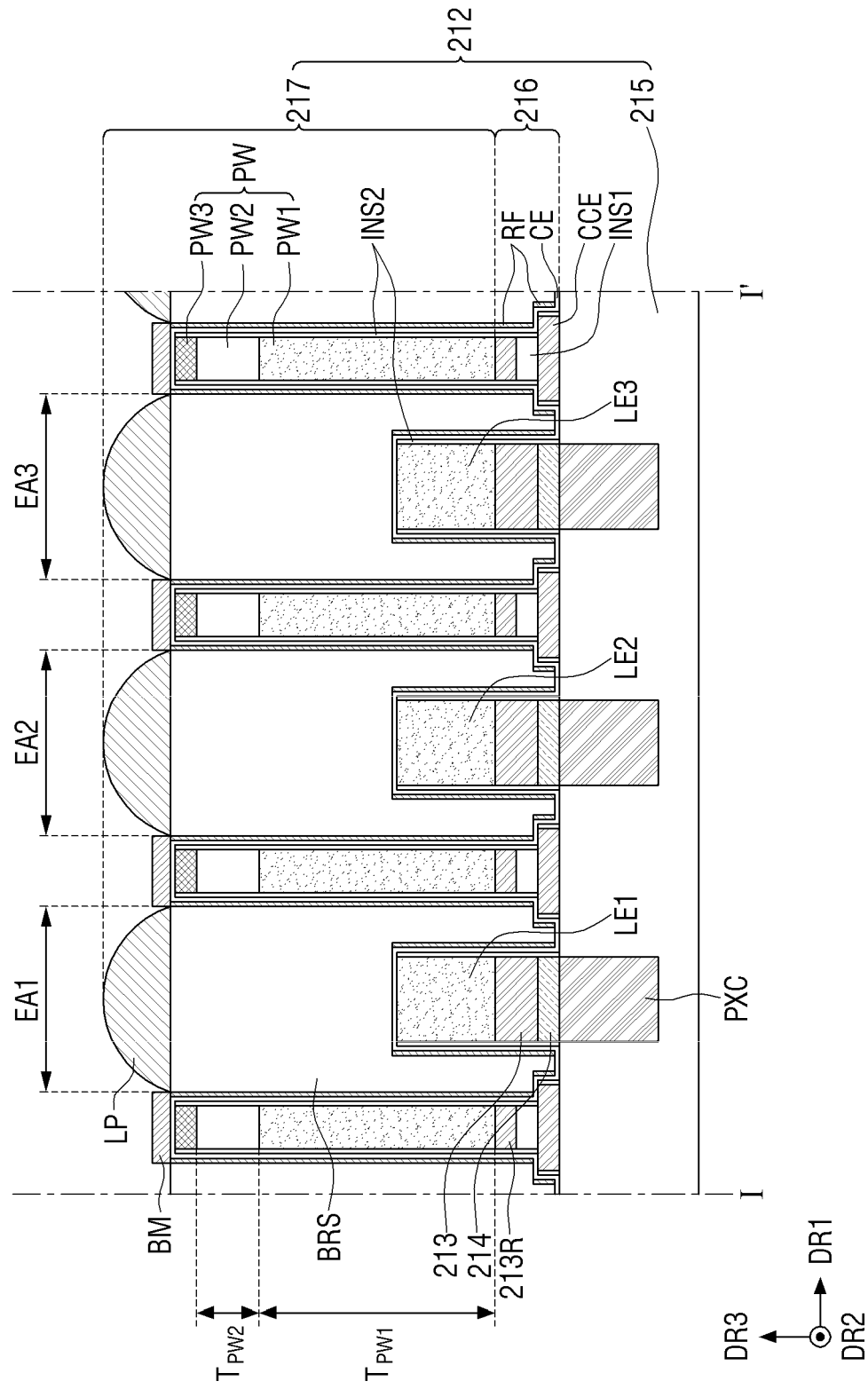
FIG. 9 is a cross-sectional view taken along the line I-I' of FIG. 8.
Figure 10:
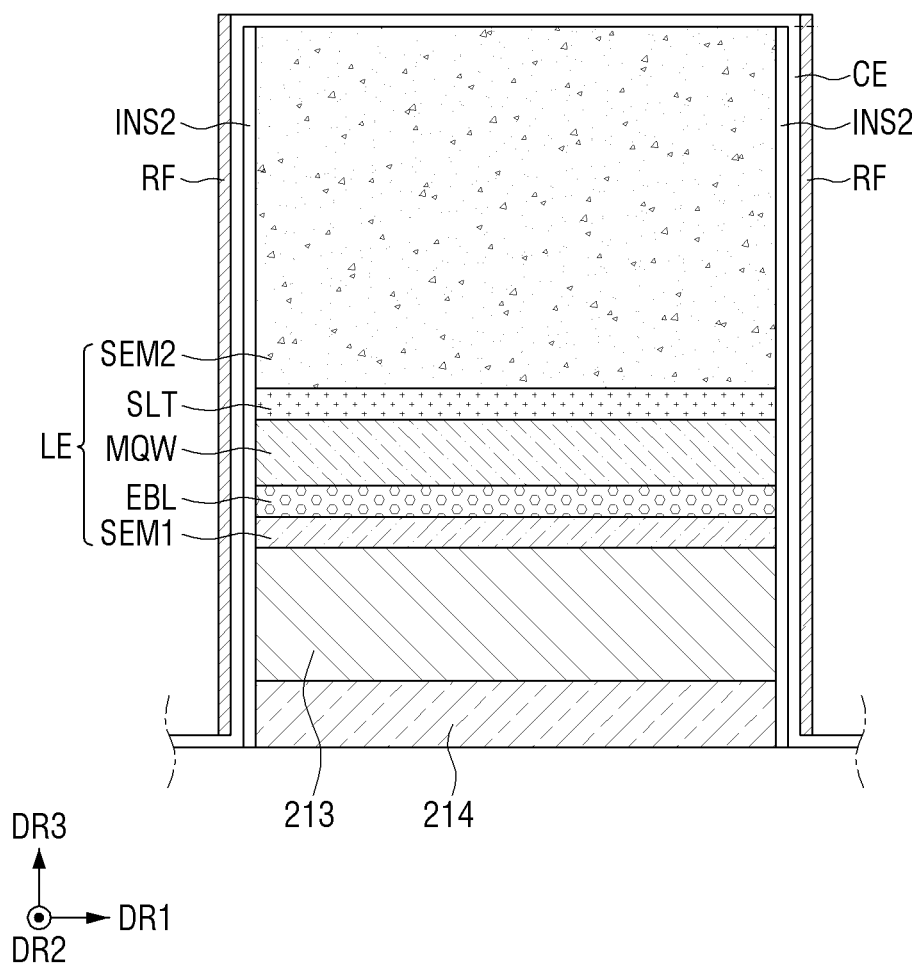
FIG. 10 is an enlarged cross-sectional view of a light-emitting element of FIG. 9.

FIG. 9 is a cross-sectional view taken along the line I-I' of FIG. 8. FIG. 10 is an enlarged cross-sectional view of a light-emitting element of FIG. 9.

Referring to FIGS. 9 and 10, the display panel 212 may include a semiconductor circuit substrate 215, a conductive connecting layer 216, and a light-emitting element layer 217.

The semiconductor circuit substrate 215 may include a plurality of pixel circuit units PXC. The conductive connecting layer 216 may include connecting electrodes 213, first pads PD1, common connecting electrodes CCE, first insulating layer INS1, and conductive patterns 213R.

The semiconductor circuit substrate 215 may be a silicon wafer substrate formed by a semiconductor process. The pixel circuit units PXC of the semiconductor circuit substrate 215 may be formed by a semiconductor process.

The pixel circuit units PXC may be located in the display area DA. The pixel circuit units PXC may be connected to their respective pixel electrodes 214.

That is, the pixel circuit units PXC may be connected one-to-one to the pixel electrodes 214. The pixel circuit units PXC may overlap with their respective light-emitting elements LE in the third direction DR3. Various other circuit structures such as 3T1C, 2T1C, 7T1C, or 7T1C may also be applicable to the pixel circuit units PXC.

The pixel electrodes 214 may be located on their respective pixel circuit units PXC. The pixel electrodes 214 may be electrodes exposed from the pixel circuit units PXC. That is, the pixel electrodes 214 may protrude from the top surfaces of the pixel circuit units PXC. The pixel electrodes 214 may be integrally formed with the pixel circuit units PXC. The pixel electrodes 214 may receive pixel or anode voltages from the pixel circuit units PXC. The pixel electrodes 214 may be formed of aluminum (Al).

The connecting electrodes 213 may be located on their respective pixel electrodes 214. The connecting electrodes 213 may include a metallic material for bonding the pixel electrodes 214 and first through fourth light-emitting elements LE1 through LE4, respectively.

The common connecting electrodes CCE may be spaced apart from the pixel electrodes 214 and the connecting electrodes 213. The common connecting electrodes CCE may be located to surround the pixel electrodes 214 and the connecting electrodes 213. The common connecting electrodes CCE may be connected to the first pads PD1 of the first pad unit PDA1 to receive a common voltage. The common connecting electrodes CCE may include the same material as the connecting electrodes 213.

The first insulating layer INS1 may be located on the common connecting electrodes CCE. The width, in the first or second direction DR1 or DR2, of the first insulating layer INS1 may be less than the width, in the first or second direction DR1 or DR2, of the common connecting electrodes CCE. As a result, parts of the top surfaces of the common connecting electrodes CCE might not be covered, but instead may be exposed by the first insulating layer INS1. The exposed parts of the top surfaces of the common connecting electrodes CCE may be in contact with a common electrode CE. Thus, the common electrode CE may be connected to the common connecting electrodes CCE.

The conductive patterns 213R may be located on the first insulating layer INS1. The conductive patterns 213R may be located between the first insulating layer INS1 and the partition wall PW. The width of the conductive patterns 213R may be substantially the same as the width of the first insulating layer INS1 or the width of the partition wall PW. The conductive patterns 213R may be remnants from the formation of the connecting electrodes 213 and the common connecting electrodes CCE.

The light-emitting element layer 217 may include the first through fourth light-emitting elements LE1 through LE4, the partition wall PW, second insulating layer INS2, the common electrode CE, a reflective layer RF, a light-blocking member BM, and optical patterns LP.

The light-emitting element layer 217 may include the first through fourth light-emitting elements LE1 through LE4, which are defined and separated by the partition wall PW. In each of first through fourth emission areas EA1 through EA4, at least one of a light-emitting element LE and an optical pattern LP may be located.

The first through fourth light-emitting elements LE1 through LE4 may be located on the connecting electrodes 213 and in the first through fourth emission areas EA1 through EA4, respectively. The length, in the third direction DR3, of the first through fourth light-emitting elements LE1 through LE4 (or the height of the first through fourth light-emitting elements LE1 through LE4) may be greater than the length, in the horizontal direction, of the first through fourth light-emitting elements LE1 through LE4. The length of the first through fourth light-emitting elements LE1 through LE4 in the horizontal direction refers to the length in the first or second direction DR1 or DR2. For example, the length of the first through fourth light-emitting elements LE1 through LE4 in the third direction DR3 may be about 1 µm to about 5 µm.

Referring to FIG. 10, a light-emitting element LE includes a first semiconductor layer SEM1, an electron blocking layer EBL, an active layer MQW, a superlattice layer SLT, and a second semiconductor layer SEM2. The first semiconductor layer SEM1, the electron blocking layer EBL, the active layer MQW, the superlattice layer SLT, and the second semiconductor layer SEM2 may be sequentially stacked in the third direction DR3.

The first semiconductor layer SEM1 may be located on a connecting electrode 213. The first semiconductor layer SEM1 may be a semiconductor layer doped with a dopant of a first conductivity type such as magnesium (Mg), zinc (Zn), calcium (Ca), selenium (Se), or barium (Ba). For example, the first semiconductor layer SEM1 may be p-GaN doped with Mg, which is a p-type dopant. The thickness $T_{sem1}$ of the first semiconductor layer SEM1 may be about 30 nm to about 200 nm.

The electron blocking layer EBL may be located on the first semiconductor layer SEM1. The electron blocking layer EBL may be a layer suppressing or preventing the flow of too many electrons into the active layer MQW. For example, the electron blocking layer EBL may be p-AlGaN doped with Mg, which is a p-type dopant. The thickness $T_{eb1}$ of the electron blocking layer EBL may be about 10 nm to about 50 nm. The electron blocking layer EBL may be omitted in other embodiments.

The active layer MQW may be classified into first, second, and third active layers. The first, second, and third active layers may include a material having a single- or multi-quantum well structure. In a case where the first, second, and third active layers include a material having a multi-quantum well structure, the first, second, and third active layers may have a structure in which a plurality of well layers and a plurality of barrier layers are alternately stacked. The first active layer MQW may include, but is not limited to, InGaN or GaAs, and the second and third active layers may include, but are not limited to, InGaN. As electron-hole pairs combine in response to an electric signal, the first, second, and third active layers may emit light. For example, the first active layer may emit first light having a main peak wavelength of about 600 nm to about 750 nm (e.g., light of the red wavelength range). The second active layer may emit third light having a main peak wavelength of about 480 nm to about 560 nm (e.g., light of the green wavelength range). The third active layer may emit second light having a main peak wavelength of about 370 nm to about 460 nm (e.g., light of the blue wavelength range).

The color of light to be emitted by the active layer MQW may vary depending on the indium (In) contents of the first, second, and third active layers. For example, as the In contents of the first, second, and third active layers decrease, the wavelength of light emitted by the active layer MQW may be switched to the red wavelength range, and as the In contents of the first, second, and third active layers increase, the wavelength of light emitted by the active layer MQW may be switched to the blue wavelength range. The In content of the first active layer may be greater than the In content of the second active layer, and the In content of the second active layer may be greater than the In content of the third active layer. For example, the In content of the third active layer may be about 15%, the In content of the second active layer may be about 25%, and the In content of the first active layer may be about 35% or greater.

As the color of light to be emitted by the active layer MQW varies depending on the In contents of the first, second, and third active layers, the entire light-emitting element layer 217 may emit the same light or may emit different light (e.g., the first light, the second light, or the third light) depending on the In contents of the first, second, and third active layers. For example, if the In contents of the first, second, and third active layers of the first light-emitting element LE1 are about 15% or less, the first light-emitting element LE1 may emit first light of a red wavelength range of about 600 nm to about 750 nm. If the In contents of the first, second, and third active layers of the second light-emitting element LE2 are about 15%, the second light-emitting element LE2 may emit second light of a green wavelength range of about 480 nm to about 560 nm. If the In contents of the first, second, and third active layers of the third light-emitting element LE3 are about 35% or greater, the third light-emitting element LE3 may emit third light of a blue wavelength range of about 370 nm to about 460 nm. By controlling or setting the In contents of the first, second, and third active layers of the fourth light-emitting element LE4, the fourth light-emitting element LE4 may be allowed to emit the first, second, or third light, or may be allowed to emit the fourth light, which is different from the first light, the second light, and the third light.

The superlattice layer SLT may be located on the active layer MQW. The superlattice layer SLT may be a layer for alleviating the stress between the second semiconductor layer SEM2 and the active layer MQW. For example, the superlattice layer SLT may be formed of InGaN or GaN. The thickness Tslt of the superlattice layer SLT may be about 50 nm to about 200 nm. The superlattice layer SLT may be omitted in other embodiments.

The second semiconductor layer SEM2 may be located on the superlattice layer SLT. The second semiconductor layer SEM2 may be doped with a dopant of a second conductivity type such as silicon (Si), germanium (Ge), or Sn. For example, the second semiconductor layer SEM2 may be n-GaN doped with Si. The thickness Tsem2 of the second semiconductor layer SEM2 may be about 2 μm to about 4 μm.

The partition wall PW may be spaced apart from the first through fourth light-emitting elements LE1 through LE4, which are located in the first through fourth emission areas EA1 through EA4, respectively. The partition wall PW may be located to surround the first through fourth light-emitting elements LE1 through LE4.

The partition wall PW may be located on the common connecting electrodes CCE. The widths, in the first and second directions DR1 and DR2, of the partition wall may be less than the widths, in the first and second directions DR1 and DR2, of the common connecting electrodes CCE. The partition wall PW may be spaced apart from the light-emitting elements LE.

The partition wall PW may include first, second, and third partition walls PW1, PW2, and PW3. The first partition wall PW1 may be located on (e.g., above) the first insulating film INS1. The first partition wall PW1 may be formed by the same process as the light-emitting elements LE, and thus, at least parts of the first partition wall PW1 may include the same material as the light-emitting elements LE.

The second insulating films INS2 may be located on, or may surround (e.g., in plan view), the side surfaces of each of the common connecting electrodes CCE, the side surfaces of the partition wall PW, the side surfaces of each of the pixel electrodes 214, the side surfaces of each of the connecting electrodes 213, and the side surfaces of each of the light-emitting elements LE. The second insulating film INS2 may be formed as inorganic films such as silicon oxide ($SiO_2$) films. The thickness of the second insulating films INS2 may be about 0.1 μm.

The common electrode CE may be located on the top surface, and may be located on, or to surround (e.g., in plan view) side surfaces, of each of the light-emitting elements LE, and may be located on the top surface, and may be locate on, or to surround (e.g., in plan view) the side surfaces of the partition wall PW. That is, the common electrode CE may be located to cover the top surface and side surfaces of each of the light-emitting elements LE, and to cover the top surface and the side surfaces of the partition wall PW.

The common electrode CE may be in contact with the second insulating films INS2, which are formed on the side surfaces of each of the common connecting electrodes CCE, the side surfaces of the partition wall PW, the side surfaces of each of the pixel electrodes 214, the side surfaces of each of the connecting electrodes 213, and the side surfaces of each of the light-emitting elements LE. Also, the common electrode CE may be in contact with the top surfaces of the common connecting electrodes CCE, the top surfaces of the light-emitting elements LE, and the top surface of the partition wall PW.

The common electrode CE may be in contact with parts of the top surfaces of the light-emitting elements LE, and may be in contact with parts of the top surfaces of the common connecting electrodes CCE that are not covered, but are instead exposed by the second insulating films INS2. Thus, a common voltage provided to the common connecting electrodes CCE may be applied to the light-emitting elements LE. That is, first ends of the light-emitting elements LE may be provided with a pixel or anode voltage through the connecting electrodes 213, and second ends of the light-emitting elements LE may be provided with the common voltage via the common electrode CE. The light-emitting elements LE may emit light at a luminance (e.g., a predetermined luminance) in accordance with the difference between the pixel voltage and the common voltage.

The reflective films RF may be located on the side surfaces of (e.g., may surround in plan view) each of the common connecting electrodes CCE, the side surfaces of the partition wall PW, the side surfaces of each of the pixel electrodes 214, the side surfaces of each of the connecting electrodes 213, and the side surfaces of each of the light-emitting elements LE. The reflective films RF may reflect light that is traveling sideways, as opposed to in an upward direction, after being emitted from the light-emitting elements LE. The reflective films RF may include a metallic material with high reflectance such as Al. The thickness of the reflective films RF may be about 0.1 μm.

In some embodiments, a base resin BRS may be located on a protective film in each of the light-emitting elements LE. The base resin BRS may include a transparent organic material. The base resin BRS may further include a scatterer for scattering light from each of the light-emitting elements LE in random directions. In this case, the scatterer may include particles of a metal oxide or organic particles.

The light-blocking member BM may be located on the partition wall PW. The light-blocking member BM may include a light-blocking material. The light-blocking member BM may be located between the first through fourth emission areas EA1 through EA4 to reduce or prevent the mixture of light of different wavelength ranges from the light-emitting elements LE. Also, the light-blocking member BM may reduce the reflection of external light incident upon the light-emitting element layer 217 by absorbing at least some of the external light. The light-blocking member BM may be positioned on the partition wall PW, and may extend further into each of the first through fourth emission areas EA1 through EA4. That is, the width of the light-blocking member BM may be greater than the width of the partition wall PW (e.g., in the first or second direction DR1 or DR2).

The optical patterns LP may be selectively located in the first through fourth emission areas EA1 through EA4. The optical patterns LP may be located directly on base resins BRS of the first through fourth emission areas EA1 through EA4. The optical patterns LP may protrude in the upward direction (e.g., in a direction from the light-emitting elements LE to the optical patterns LP). For example, the optical patterns LP may have an upwardly convex lens shape in a cross-sectional view. The optical patterns LP may be located on the base resins BRS and the light-emitting member BM. The width of the optical patterns LP may be the same as, greater than, or less than, the width of the first through fourth emission areas EA1 through EA4 (e.g., in the first or second direction DR1 or DR2). The optical patterns LP may collect first, second, third, and/or fourth light transmitted through the base resins BRS of the first through fourth emission areas EA1 through EA4.

Figure 11:
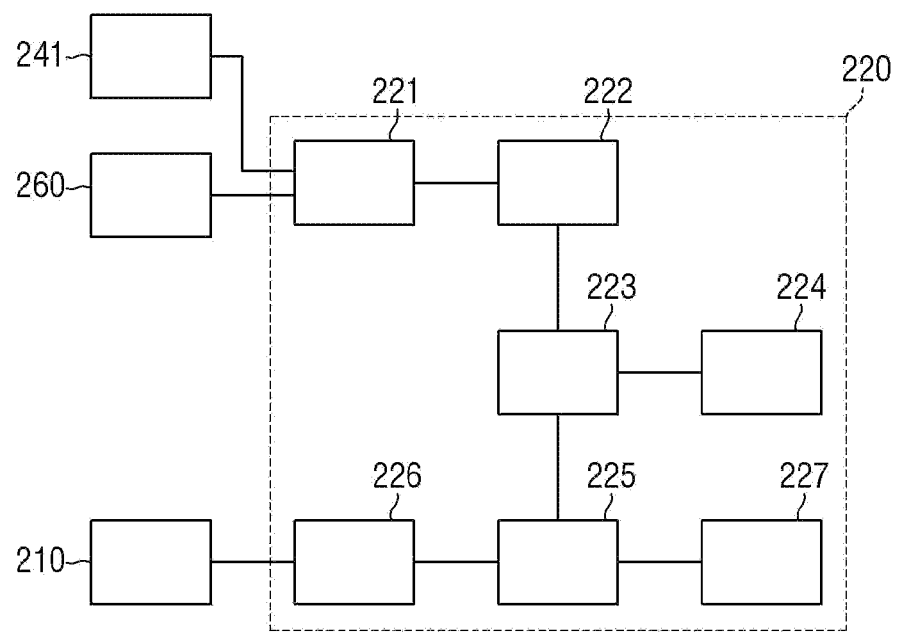
FIG. 11 is a block diagram of a control module of the apparatus of FIGS. 2 through 4.

FIG. 11 is a block diagram of the control module of the apparatus of FIGS. 2 through 4.

Referring to FIG. 11, the control module 220 includes a sensing signal detection unit 221, a sensing signal analysis unit 222, a sensing location matching unit 223, a content data providing unit 224, a content modulation unit 225, a display control unit 226, and a wireless communication unit 227.

For example, the sensing signal detection unit 221 receives sensing signals from the sensing module 240, which includes the depth sensor 241. The sensing signal detection unit 221 receives image data from the image sensor 260, and receives pupil detection signals from the first and second biometric sensors 231 and 232. The sensing signal detection unit 221 filters the sensing signals and the pupil sensing signals, and performs preprocessing (such as analog-to-digital conversion) on the sensing signals and the pupil sensing signals. The sensing signal detection unit 221 aligns the image data and sequentially outputs the image data in units of one or more frames or horizontal lines.

The sensing signal analysis unit 222 detects moving direction information of the apparatus 200 and front-direction image data using the preprocessed sensing signals and the image data from the sensing signal detection unit 221. The sensing signal analysis unit 222 divides the front-direction image data into a plurality of block regions. Also, the sensing signal analysis unit 222 detects the coordinates of the user's gaze direction based on matrix layout information of IR sensors in the first and second biometric sensors 231 and 232 and based on the result of analysis of the pupil sensing signals with reference to the matrix layout information. Then, the sensing signal analysis unit 222 detects the user's hand or a pointing tool by analyzing a block region of the front-direction image data corresponding to the coordinates of the user's gaze direction.

Once the shape of the user's hand (or the pointing tool) is detected from the block region corresponding to the coordinates of the user's gaze direction, the sensing signal analysis unit 222 transmits a detection start signal to the sensing location matching unit 223 and the content modulation unit 225. Thereafter, the sensing signal analysis unit 222 continuously detects three-axis location coordinate information (e.g., coordinate information for the X-, Y-, and Z-axes) in accordance with changes in the location, the moving direction, and the shape of the user's hand (or the pointing tool) and generates moving path data by connecting the three-axis location coordinate information. For example, the sensing signal analysis unit 222 generates moving path data in accordance with changes in the shape and location of the user's hand by continuously storing the three-axis coordinates of the user's hand that continue to be detected, in predefined coordinate space data or block data of the same size as the AR content.

The sensing location matching unit 223 sequentially receives moving path data for changes in the shape and the location of the user's hand from the sensing signal analysis unit 222. Also, the sensing location matching unit 223 sequentially receives AR content from the content data providing unit 224. The sensing location matching unit 223 matches the coordinates of the user's hand to image objects of the image of the AR content by matching the 3-axis coordinates of the user's hand, included in the moving path data, to frame-by-frame image data of the AR content in real time. Also, the sensing location matching unit 223 sequentially outputs the coordinates of the user's hand and the image objects that are matched to the coordinates of the user's hand, in units of one or more frames.

The content modulation unit 225 sequentially receives the coordinates of the user's hand, and the image objects that are matched to the coordinates of the user's hand, from the sensing location matching unit 223 in units of one or more frames. Then, the content modulation unit 225 modulates, for example, general image data of the AR content or the size, location, color, and motion of the image objects that are matched to the coordinates of the user's hand, to correspond to the coordinates of the user's hand that change in units of one or more frames. The content modulation unit 225 may also modulate, for example, sound data, in accordance with the modulated image data of the AR content or the modulated size, location, color, and motion of the image objects that are matched to the coordinates of the user's hand.

The display control unit 226 controls an image display operation of the display module 210 such that the AR content provided by the content data providing unit 224 may be displayed via the display module 210 and the transparent lens 201. If the AR content is modulated by the content modulation unit 225, the display control unit 226 controls the image display operation of the display module 210 such that the modulated AR content may be displayed. The display control unit 226 may convert the modulated AR content provided by the content modulation unit 225 to be compatible with the display module 210, and a sound device and may provide the converted AR content to the display module 210 and the sound device. The display control unit 226 may transmit control signals for controlling the driving timing of the display module 210 and the sound device to the display module 210 and the sound device, such that the modulated AR content may be displayed via the display module 210 and the sound device.

The wireless communication unit 227 includes at least one of a Bluetooth® module, an infrared data association (IrDA™) module, a Wi-Fi-Direct® module, and a near field communication (NFC) module (Wi-Fi® and Wi-Fi-Direct® being registered trademarks of the non-profit Wi-Fi Alliance, BLUETOOTH® being a registered trademark of Bluetooth Sig, Inc., Kirkland, Wash., and IRDA being a trademark of Infrared Data Association). Thus, the wireless communication unit 227 may perform wireless communication with, for example, at least one content display device, in at least one of a Bluetooth® method, an IrDA™ method, a Wi-Fi-Direct® method, and an NFC method. Accordingly, the wireless communication unit 227 may transmit/share the modulated AR content to/with the content display device such that the modulated AR content may also be displayed by the content display device.

Figure 12:
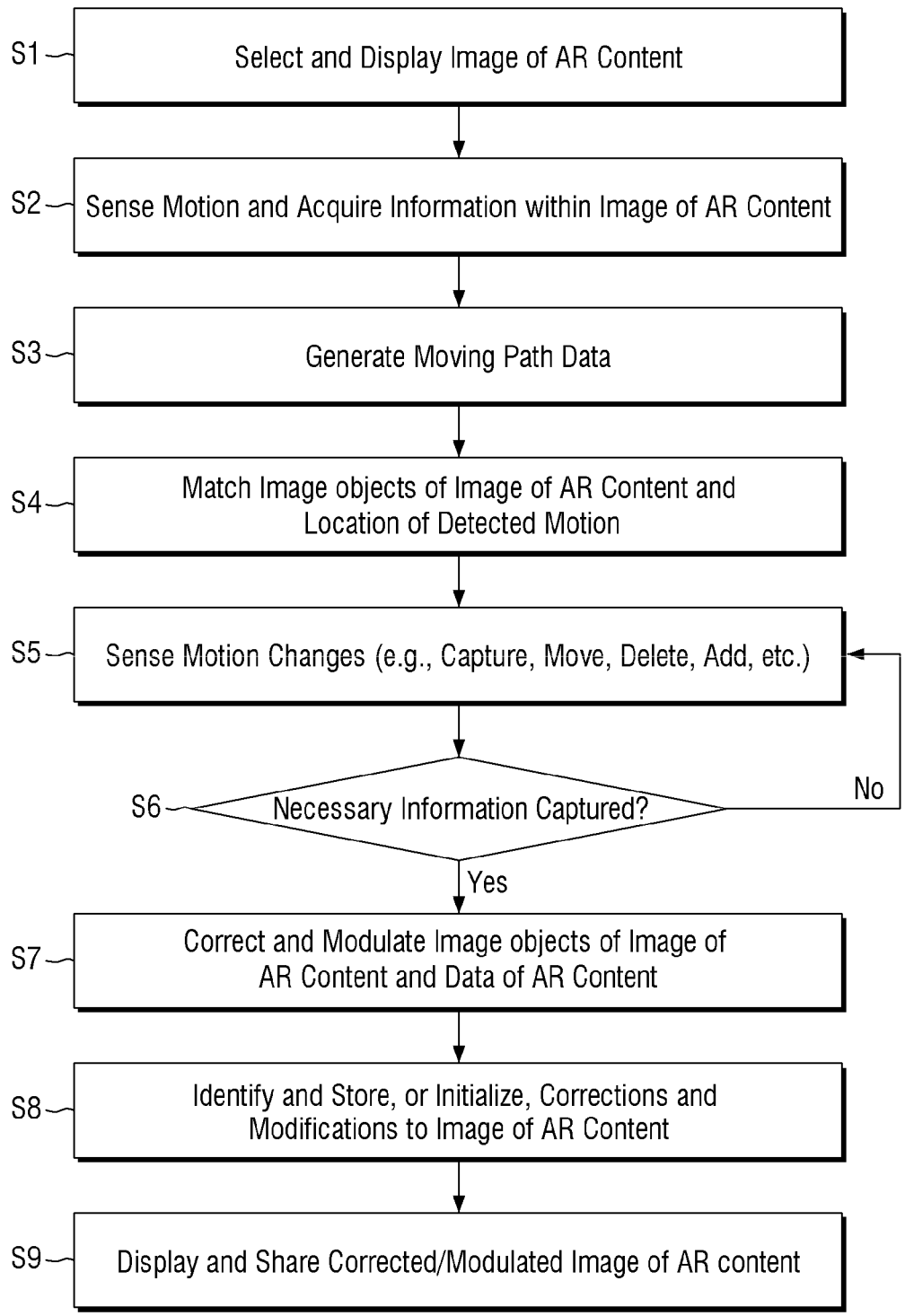
FIG. 12 is a flowchart illustrating how the apparatus of FIG. 1 modifies and displays AR content.
Figure 13:
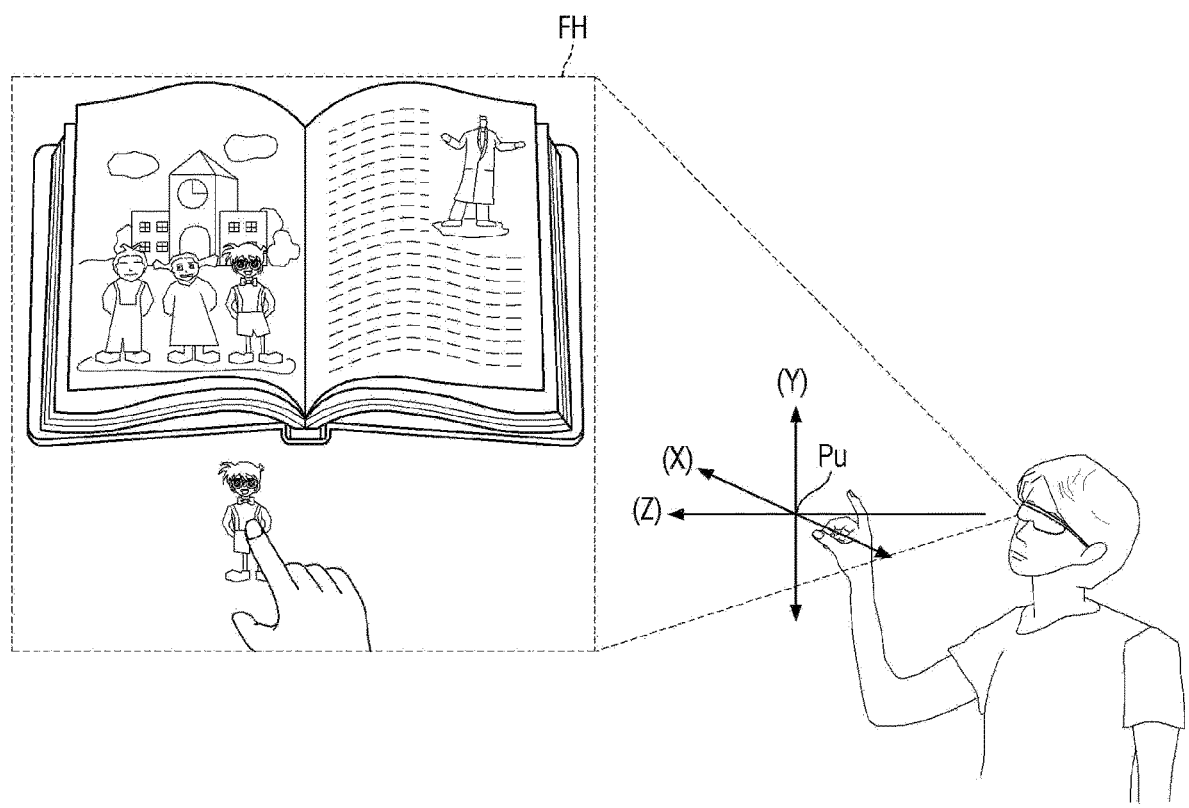
FIG. 13 illustrates how to display AR content and recognize the location of a hand of a user with the use of the apparatus of FIG. 1.
Figure 14:
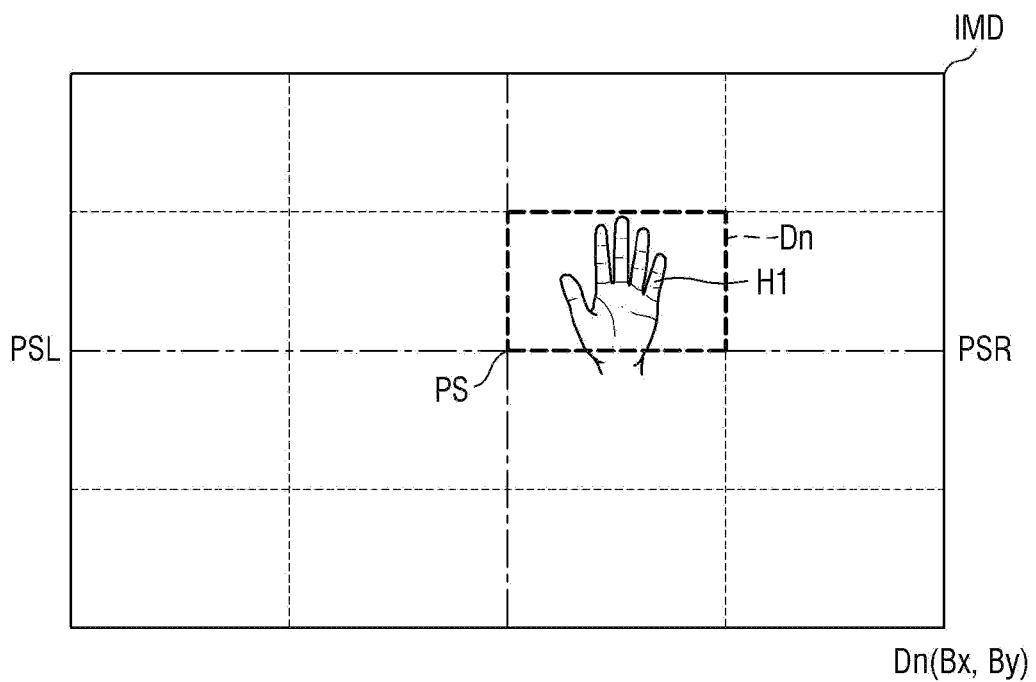
FIG. 14 illustrates how to recognize the location of the hand of the user with the use of image data.

FIG. 12 is a flowchart illustrating how the apparatus of FIG. 1 modifies and displays AR content. FIG. 13 illustrates how to display AR content and recognize the location of a hand of a user with the use of the apparatus of FIG. 1. FIG. 14 illustrates how to recognize the location of the hand of the user with the use of image data.

Referring to FIGS. 12 and 13, the display control unit 226 controls the image display operation of the display module 210 such that the AR content from the content data providing unit 224 is displayed via the display module 210 and the transparent lens 201 (S1 of FIG. 12).

Referring to FIGS. 13 and 14, the sensing signal analysis unit 222 detects front-direction image data IMD of the apparatus 200 based on sensing signals and image data received in real time from the sensing signal detection unit 221. Here, the front-direction image data IMD may be captured and detected as frame data having a size and resolution (e.g., a predefined size and resolution) in accordance with the range of angles of view (from "PSL" to "PSR") of the image sensor 260. The sensing signal analysis unit 222 may detect and generate the front-direction image data IMD in units of frames having a size corresponding to the range of angles of view of the image sensor 260 with respect to the front direction/forward direction or a front point PS of the image sensor 260. The sensing signal analysis unit 222 stores the front-direction image data IMD in a separate memory in units of one or more frames.

The sensing signal analysis unit 222 divides the front-direction image data IMD into a plurality of block regions $Dn(B_x, B_y)$. The sensing signal analysis unit 222 detects gaze direction coordinate information Pu of the user based on the matrix layout information of the IR sensors in the first and second biometric sensors 231 and 232, and the result of the movement analysis (in matrix directions) of the pupil sensing signals. Then, the sensing signal analysis unit 222 detects the shape of the user's hand by analyzing the image of a block region Dn corresponding to the gaze direction coordinate information Pu. The sensing signal analysis unit 222 may detect an image of a hand by analyzing the differences in grayscale or luminance between pixels of the block region Dn or by comparing pixel data of the block region Dn and a mask having the shape of the user's hand.

Figure 15:
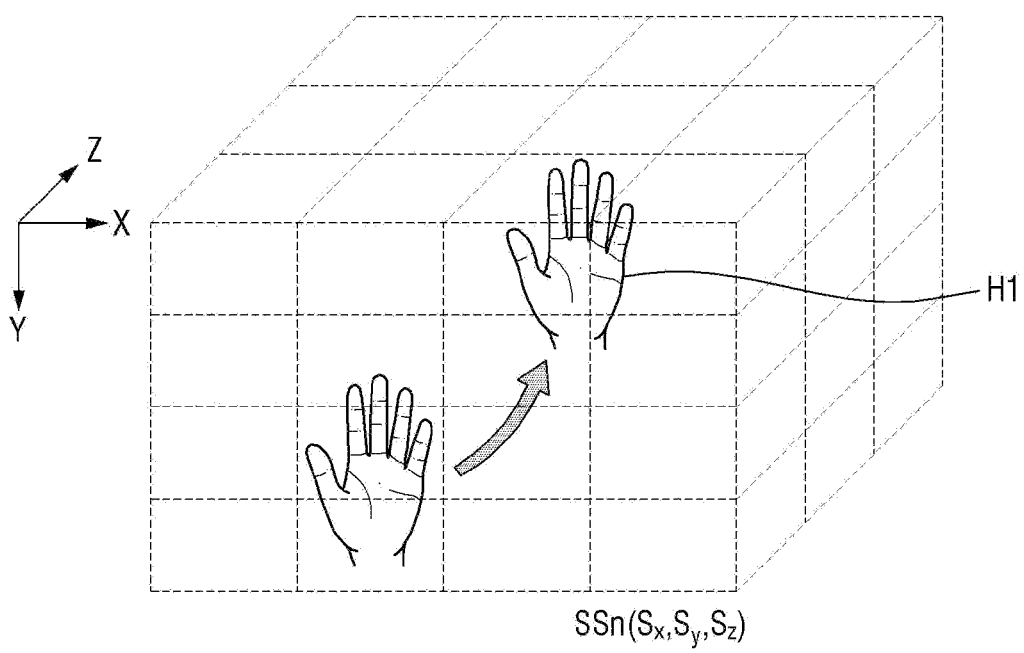
FIG. 15 illustrates how to recognize the motion and the location of the hand of the user with the use of the apparatus of FIG. 1.

FIG. 15 illustrates how to recognize the motion and the location of the hand of the user with the use of the apparatus of FIG. 1.

Referring to FIG. 15, if the image of a hand H1 of the user is detected from the front-direction image data IMD, the sensing signal analysis unit 222 continuously detects X-axis, Y-axis, and Z-axis coordinate information $SSn(S_x, S_y, S_z)$ in accordance with changes in the location, the moving direction, and the shape of the hand H1 (S2 of FIG. 12), and generates moving path data by connecting the X-axis, Y-axis, and Z-axis coordinate information $SSn(S_x, S_y, S_z)$.

The sensing signal analysis unit 222 generates moving path data for any changes in the shape and the location of the hand H1, as indicated by an arrow of FIG. 15, by continuously storing the X-axis, Y-axis, and Z-axis coordinate information $SSn(S_x, S_y, S_z)$ in predefined coordinate space data or block data of the same size as the AR content (S3 of FIG. 12).

Figure 16:
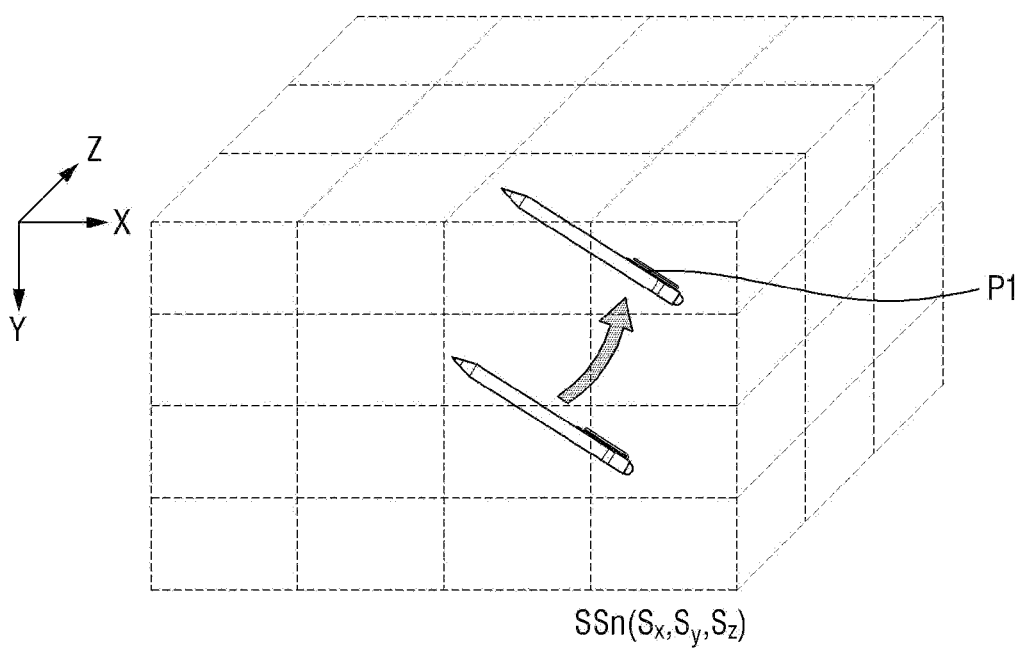
FIG. 16 illustrates how to recognize the presence and the location of an electronic pen with the use of the apparatus of FIG. 1.

FIG. 16 illustrates how to recognize the presence and the location of an electronic pen with the use of the apparatus of FIG. 1.

Referring to FIG. 16, the sensing signal analysis unit 222 may detect a pointing tool P1, such as an electronic pen, a writing instrument, or a laser pointer from the front-direction image data IMD. If the shape of the pointing tool P1 is detected from the front-direction image data IMD, the sensing signal analysis unit 222 may continuously detect X-axis, Y-axis, and Z-axis coordinate information $SSn(S_x, S_y, S_z)$ of the pointing tool P1 in accordance with changes in the location, the moving direction, and the shape of the pointing tool P1 and may generate moving path data by connecting the X-axis, Y-axis, and Z-axis coordinate information $SSn(S_x, S_y, S_z)$. For example, the sensing signal analysis unit 222 generates moving path data in accordance with a change in the location of the pointing tool P1, as indicated by an arrow of FIG. 16, by continuously storing the X-axis, Y-axis, and Z-axis coordinate information SSn $(S_x, S_y, S_z)$ of the pointing tool P1 that continues to be detected, in predefined coordinate space data or block data of the same size as the AR content.

Figure 17:
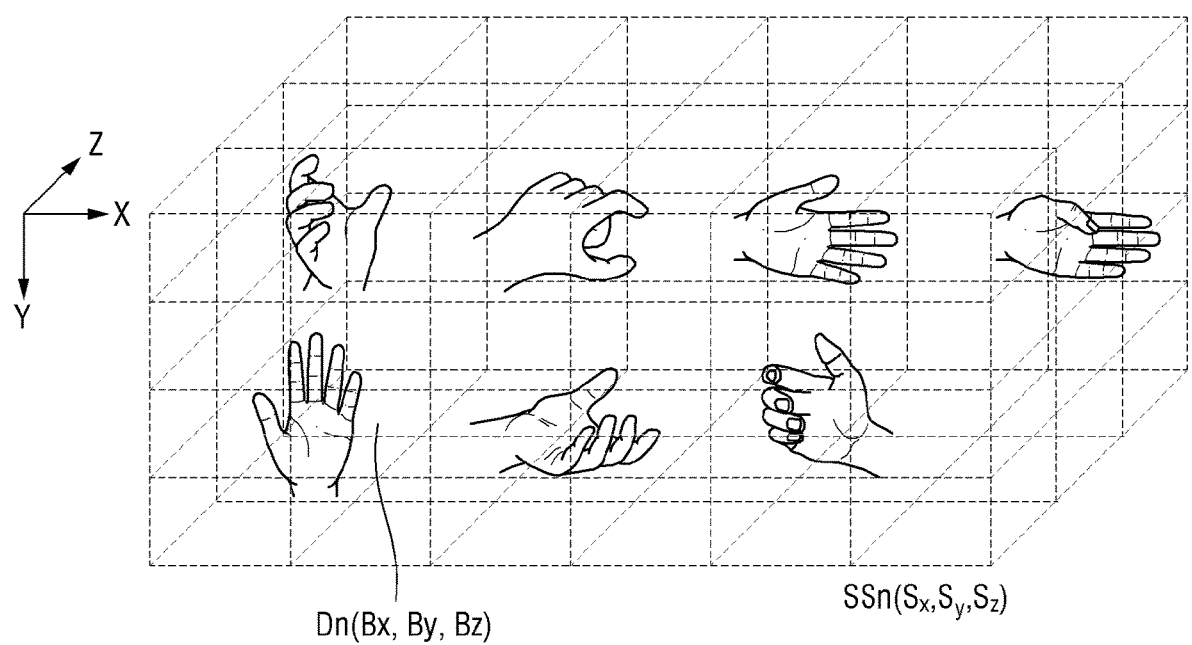
FIG. 17 illustrates how to recognize various hand gestures and movements with the use of the apparatus of FIG. 1.

FIG. 17 illustrates how to recognize various hand gestures and movements with the use of the apparatus of FIG. 1.

Referring to FIG. 17, if the shape of the hand H1 is detected from the front-direction image data IMD, and the sensing signal analysis unit 222 continuously detects X-axis, Y-axis, and Z-axis coordinate information $SSn(S_x, S_y, S_z)$ of the hand H1 in accordance with changes in the location and the moving direction of the hand H1. Then, the sensing signal analysis unit 222 may identify a block region corresponding to the X-axis, Y-axis, and Z-axis coordinate information $SSn(S_x, S_y, S_z)$, and may capture or detect an image of the hand H1 by analyzing the differences in depth sensing signals between a plurality of block regions $Dn(B_x, B_y, B_z)$ of the front-direction image data IMD and the differences in grayscale or luminance between pixels of the block region corresponding to the X-axis, Y-axis, and Z-axis coordinate information $SSn(S_x, S_y, S_z)$, or by comparing pixel data of the block region corresponding to the X-axis, Y-axis, and Z-axis coordinate information $SSn(S_x, S_y, S_z)$ and a mask having the shape of the hand H1. The sensing signal analysis unit 222 may continuously detect images of the hand H1, and may transmit the detected images to the sensing location matching unit 223.

Figure 18:
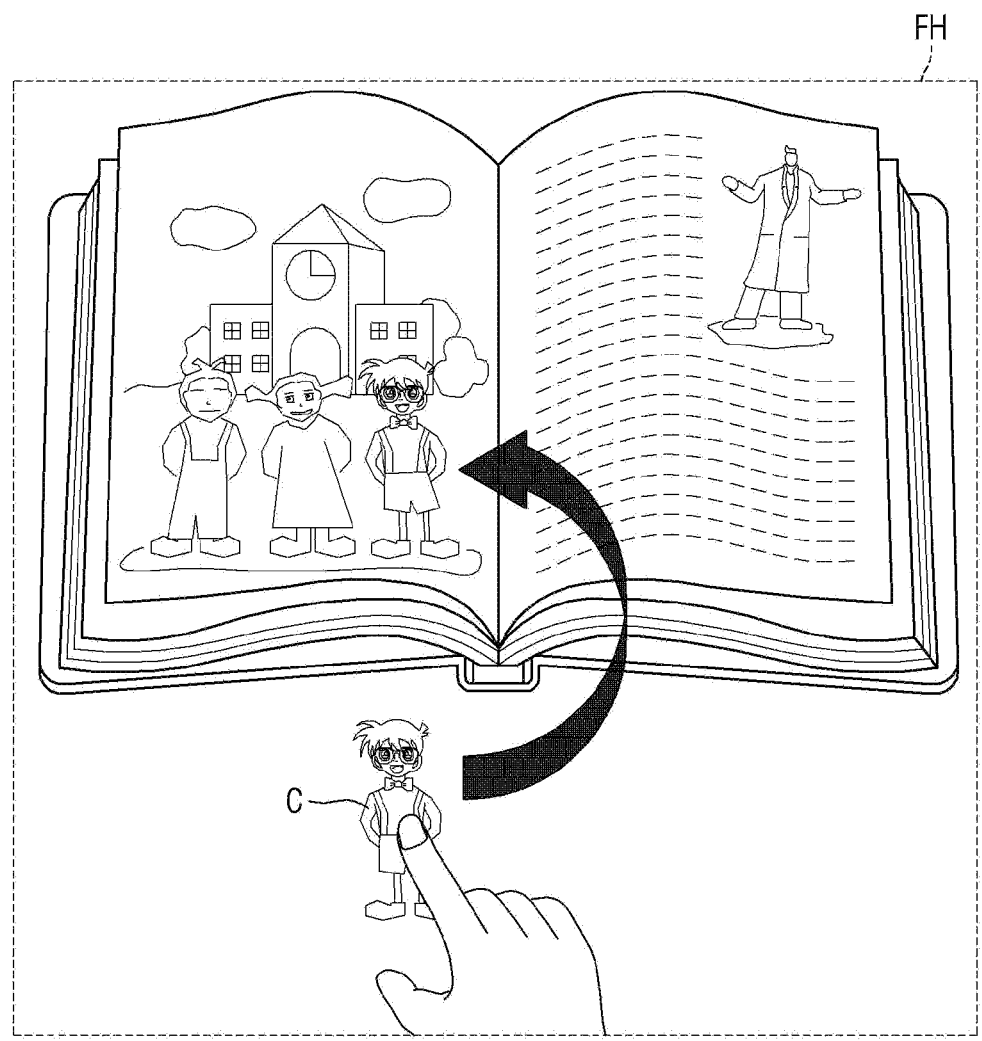
FIG. 18 illustrates how to match and modulate location and motion information of the hand of the user and AR content.

FIG. 18 illustrates how to match and modulate location and motion information of the hand of the user and AR content.

Referring to FIG. 18, the sensing location matching unit 223 sequentially receives moving path data for changes in the shape and the location of the user's hand (e.g., for changes in X-axis, Y-axis, and Z-axis coordinate information $SSn(S_x, S_y, S_z)$ of the user's hand) from the sensing signal analysis unit 222. Also, the sensing location matching unit 223 sequentially receives AR content from the wireless communication unit 227 or from the content data providing unit 224.

The sensing location matching unit 223 matches the X-axis, Y-axis, and Z-axis coordinate information $SSn(S_x, S_y, S_z)$ of the user's hand to image objects C of image data of the AR content by matching the X-axis, Y-axis, and Z-axis coordinate information $SSn(S_x, S_y, S_z)$ of the user's hand to frame-by-frame image data of the AR content in real time (S4 of FIG. 12). Also, the sensing location matching unit 223 transmits the X-axis, Y-axis, and Z-axis coordinate information $SSn(S_x, S_y, S_z)$ of the user's hand and data of the image objects C to the content modulation unit 225 in units of one or more frames (S4 of FIG. 12).

The content modulation unit 225 may determine whether to modulate the data of the image objects C based on changes in the X-axis, Y-axis, and Z-axis coordinate information $SSn(S_x, S_y, S_z)$ of the user's hand. That is, the content modulation unit 225 may determine whether to modulate the data of the image objects C based on the amount by which the coordinates of the user's hand change in units of predefined reference frames (S5 of FIG. 12). Also, the content modulation unit 225 may continuously detect changes in the shape of the user's hand based on hand shape image data, and may determine whether to modulate the data of the image objects C in accordance with commands designated in advance for various hand shapes (S6 of FIG. 12).

Figure 19:
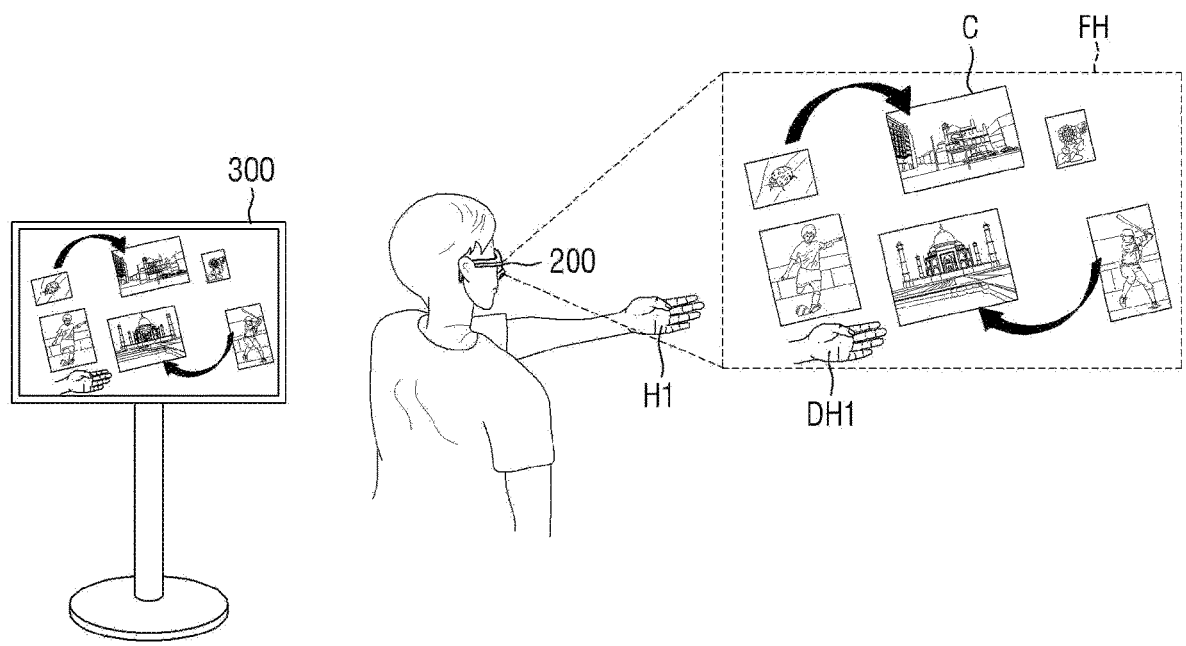
FIG. 19 illustrates how to match and modulate the motion of the hand of the user and AR content.

FIG. 19 illustrates how to match and modulate the motion of the hand of the user and AR content.

Referring to FIG. 19, the content modulation unit 225 modulates general image data of AR content or data of image objects C of the image data of the AR content, such as the size, the location, the color, or the motion of the image objects C, to correspond to coordinate information $SSn(S_x, S_y, S_z)$ of the user's hand that changes in units of one or more frames (S7 of FIG. 12).

For example, the content modulation unit 225 may continuously detect changes in the shape of the user's hand based on hand shape image data DH1, and may modulate the general image data of the AR content or the data of the image objects C (such as the size, the location, the color, or the motion of the image objects C) in accordance with commands designated in advance for various hand shapes (S7 of FIG. 12).

The image objects C may rotate, or the size, the location, the color, or the motion of the image objects C may change, in accordance with the shape or the motion of the user's hand. For example, if the image objects C include an image of a book, the pages of the book may be turned, or the book may be replaced or moved. If the image objects C include a video object, the size or the location of the video object or the options of the video object, such as video play, may be modified. If the image objects C include text, the text may be moved or placed in perspective, or may be written or deleted.

If the AR content is modulated, the display control unit 226 controls the image display operation of the display module 210 such that the modified AR content is displayed. The display control unit 226 may provide the modified AR content and control signals for controlling the driving timing of the display module 210 to the display module 210 and may thus allow the modified AR content to be displayed via the display module 210 (S8 of FIG. 12). The wireless communication unit 227 may transmit/share the modified AR content to at least one external device, for example, at least one content display device 300, such that the modified AR content may also be displayed by the content display device 300 (S9 of FIG. 12).

The content display device 300 may display AR content shared or received from the apparatus 200, such as, for example, an AR content image, on a screen. In response to modified AR content being received via the content modulation unit 225, the content display device 300 displays the received modified AR content on the screen. In other words, the content display device 300 may display the received modified AR content on the screen at the same timing as the apparatus 200.

The content display device 300 may be applicable to a mobile communication device such as a smartphone or a tablet personal computer (PC), a personal digital assistant (PDA), a portable multimedia player (PMP), a television (TV), a gaming console, a wristwatch-type electronic device, an HMD, a PC monitor, a notebook computer, a flat panel display device, a car navigation system, a car dashboard, a digital camera, a camcorder, an external billboard, an electric sign, a medical device, an inspection device, a home appliance such as a refrigerator or a washing machine, or an Internet-of-Things (IoT) device. The content display device 300 will hereinafter be described as being, for example, a flat panel display device for use in learning and lectures, and the flat panel display device may have a high or ultrahigh resolution of High Definition (HD), Ultra HD (UHD), 4K, or 8K.

Examples of the flat panel display device include an organic light-emitting diode (OLED) display device, an inorganic electroluminescent (EL) display device, a quantum-dot light-emitting diode (QED) display device, a micro-light-emitting diode (micro-LED) display device, a nano-light-emitting diode (nano-LED) display device, a plasma display panel (PDP) display device, a field emission display (FED) device, a cathode ray tube (CRT) display device, a liquid crystal display (LCD) device, and an electrophoretic display (EPD) device. The content display device 300 may be, for example, a micro-LED display device, but the present disclosure is not limited thereto. That is, the content display device 300 may also be applicable to various other display devices.

Figure 20:
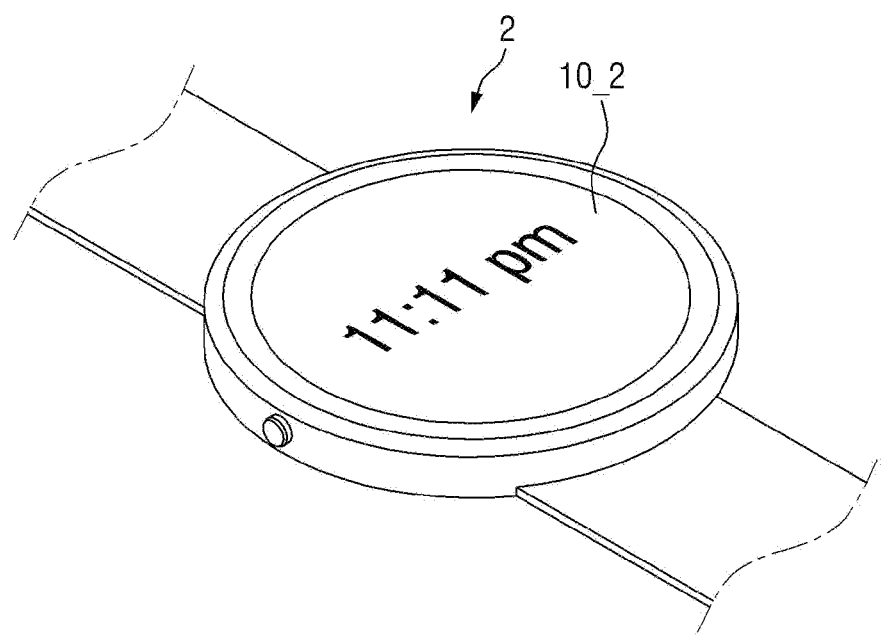
FIG. 20 is a perspective view of a watch-type smart device including a display module according to some embodiments of the present disclosure.

FIG. 20 is a perspective view of a watch-type smart device including a display module according to some embodiments of the present disclosure.

Referring to FIG. 20, an image display device 10_2 of the apparatus 200 may be applicable to a watch-type smart device 2. The watch-type smart device 2 may be applicable to an HMD including a headband that may be worn on the head, instead of the eyeglass temples 30a and 30b. That is, the watch-type smart device 2 is not particularly limited to that illustrated in FIG. 20, and may be applicable to various types of electronic devices.

Figure 21:
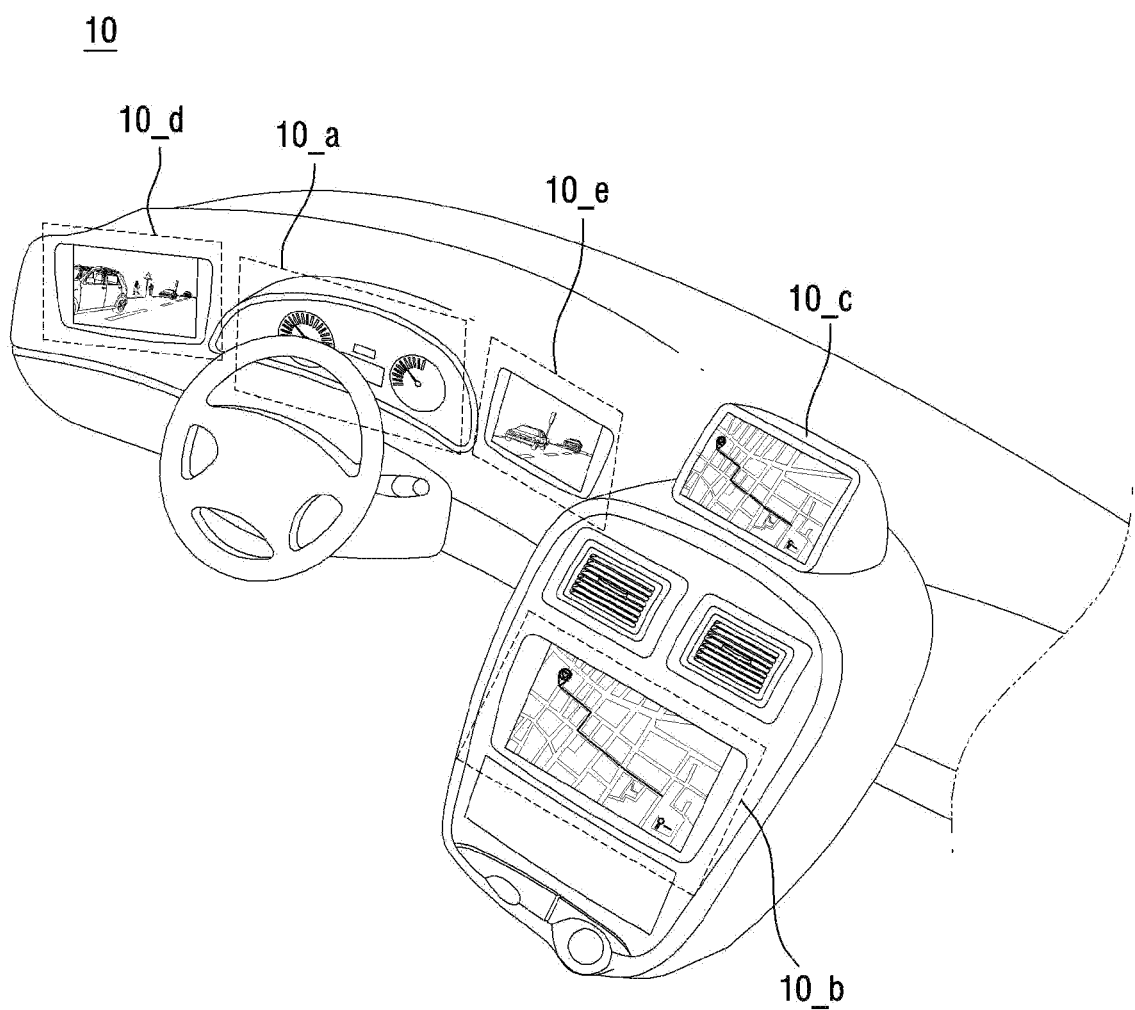
FIG. 21 is a perspective view of a dashboard and a center fascia of a vehicle including display modules according to some embodiments of the present disclosure.

FIG. 21 is a perspective view of a dashboard and a center fascia of a vehicle including display modules according to some embodiments of the present disclosure.

Referring to FIG. 21, the image display device 110 of the apparatus 200 may be applicable to an instrument panel 10_a, a center fascia 10_b, and center information displays (CIDs) 10_d and 10_e of the dashboard. Also, the image display device 110 of the apparatus 200 may be applicable to a navigation system 10_c, and to room mirror displays that can replace the rear view mirrors of the vehicle.

FIG. 22 is a transparent display device including a display module according to some embodiments of the present disclosure.

Referring to FIG. 22, the image display device 110 of the apparatus 200 may be applied to a transparent display device 10_3. The transparent display device may display an image IM and, at the same time, may transmit light therethrough. Thus, a user at the front of the transparent display device may view not only the image IM on the image display device 110, but also an object RS or the background at the rear of the transparent display device. In a case where the image display device 110 is applied to the transparent display device, the display panel 212 of the image display device 110 may include light-transmitting parts capable of transmitting light therethrough or may be formed of a material capable of transmitting light therethrough.

In concluding the detailed description, those skilled in the art will appreciate that many variations and modifications can be made to the disclosed embodiments without substantially departing from the aspects of the present disclosure. Therefore, the disclosed embodiments of the disclosure are used in a generic and descriptive sense only and not for purposes of limitation.

What is claimed is:

1. An apparatus for providing augmented reality (AR), the apparatus comprising:
   a support frame supporting at least one transparent lens;
   at least one display module for displaying AR content through the at least one transparent lens;

a sensing module assembled to, or integrally formed with, the support frame, for detecting image data from a forward direction of the support frame with a depth sensor or an image sensor, for sensing signals for changes in motion, shape, or a location of a user's hand or a location of a pointing tool with the depth sensor or the image sensor, and for detecting the user's eyeballs or pupils with a first biometric sensor or a second biometric sensor; and a control module for detecting motion information of the user's hand or of the pointing tool based on the signals and the image data, for modulating the AR content to correspond to the motion information, and for providing the modulated AR content to the at least one display module.

2. The apparatus of claim 1, wherein the at least one display module is assembled to at least one side of the support frame, or is integrally formed with the support frame, and is configured to display an image of the AR content through an image transmitting member and reflective members of the at least one transparent lens.

3. The apparatus of claim 1, wherein the control module is configured to generate coordinate information of the user's hand or the pointing tool by:
dividing front-direction image data of the sensing module into a plurality of block regions;
detecting coordinates of the user's gaze direction based on a result of analyzing pupil sensing signals via the first or second biometric sensors; and
detecting the user's hand or the pointing tool from an image of a block region corresponding to the coordinates of the user's gaze direction.

4. The apparatus of claim 3, wherein, in response to the user's hand or the pointing tool being detected from the image of one of the block regions corresponding to the coordinates of the user's gaze direction, the control module is configured to continuously detect the motion information, which comprises X-axis, Y-axis, and Z-axis coordinate information, in accordance with changes in the location and the shape of the user's hand, is configured to generate moving path data by connecting the X-axis, Y-axis, and Z-axis coordinate information, and is configured to modulate data of the AR content by matching the coordinates of the user's hand or the pointing tool, comprised in the moving path data, with image objects of an image of the AR content.

5. The apparatus of claim 4, wherein the control module is configured to modulate a general image of the AR content or display characteristic data of the image objects to correspond to changes in the coordinates of the user's hand or the pointing tool, and is configured to transmit the image or the display characteristic data to the at least one display module and at least one external content display device.

6. The apparatus of claim 1, wherein the control module comprises:
a sensing signal detection unit, which is configured to receive the signals and pupil sensing signals from the sensing module, is configured to preprocess the signals and the pupil sensing signals, and is configured to align and sequentially output the image data in units of one or more frames or horizontal lines;
a sensing signal analysis unit, which is configured to divide the image data into block regions, and is configured to generate moving path data by connecting X-axis, Y-axis, and Z-axis coordinate information of the user's hand or the pointing tool in response to the user's hand or the pointing tool being detected from images of the block regions;
a sensing location matching unit, which is configured to match the X-axis, Y-axis, and Z-axis coordinate information of the user's hand or the pointing tool, comprised in the moving path data, with image objects of an image of the AR content; and
a content modulation unit, which is configured to modulate a general image of the AR content or display characteristic data of the image objects to correspond to changes in the X-axis, Y-axis, and Z-axis coordinate information of the user's hand or the pointing tool.

7. The apparatus of claim 6, wherein the sensing signal analysis unit is configured to divide front-direction image data of the sensing module into a plurality of block regions, is configured to detect coordinates of the user's gaze direction based on matrix layout information of infrared (IR) sensors comprised in the sensing module and a result of analyzing movement of pupil sensing signals from the infrared (IR) sensors with reference to the matrix layout information, and is configured to detect the X-axis, Y-axis, and Z-axis coordinate information of the user's hand or the pointing tool by detecting the user's hand or the pointing tool from an image of one of the block regions corresponding to the coordinates of the user's gaze direction.

8. The apparatus of claim 7, wherein the sensing signal analysis unit is configured to detect an image of the user's hand or the pointing tool based on at least one of a result of analyzing differences in grayscale or luminance between pixels of the one of the block regions corresponding to the coordinates of the user's gaze direction and a result of analyzing pixel data of the one of the block regions corresponding to the coordinates of the user's gaze direction and a mask having the shape of the user's hand or the pointing tool.

9. The apparatus of claim 8, wherein the sensing signal analysis unit is configured to generate the moving path data of the user's hand or the pointing tool by continuously storing the X-axis, Y-axis, and Z-axis coordinate information of the user's hand or the pointing tool in coordinate space data or block data having a size of the AR content.

10. The apparatus of claim 1, wherein the at least one display module comprises at least one image display device, which is configured to display an image of the AR content, and an image transmitting member, which is configured to transmit the image of the AR content to the at least one transparent lens, and
wherein the image transmitting member comprises at least one optical member comprising an optical waveguide, a diffusion lens, or a focusing lens.

11. The apparatus of claim 10, wherein the at least one image display device comprises:
a partition wall, which is defined and arranged on a substrate in a RGB matrix structure;
light-emitting elements in respective emission areas, defined in the RGB matrix structure by the partition wall, and extending in a thickness direction of the substrate;
a base resin in the emission areas; and
optical patterns in at least one of the emission areas.

12. The apparatus of claim 11, wherein the emission areas comprise first through third emission areas, or first through fourth emission areas, in each pixel region in the RGB matrix structure.

13. The apparatus of claim 12, wherein the first emission area comprises a first light-emitting element for emitting a first light of red, green, or blue, wherein the second emission area comprises a second light-emitting element for emitting second light of red, green, or blue and different from the first light, wherein the third emission area comprises a third light-emitting element for emitting third light of red, green, or blue, and different from the first light and the second light, and wherein the fourth emission area comprises a fourth light-emitting element for emitting fourth light that is the same as one of the first light, the second light, or the third light.

14. The apparatus of claim 12, wherein the first through fourth emission areas have a same size or planar area, and wherein respective distances, in a horizontal direction or a diagonal direction, between the first and second emission areas, between the second and third emission areas, between the first and third emission areas, and between the third and fourth emission areas are the same.

15. The apparatus of claim 12, wherein the first through fourth emission areas have different respective sizes or planar areas, and wherein respective distances, in a horizontal direction or a diagonal direction, between the first and second emission areas, between the second and third emission areas, between the first and third emission areas, and between the third and fourth emission areas are the same or different depending on a size or a planar area of the first through fourth emission areas.

16. A method of providing augmented reality (AR), the method comprising:

displaying AR content via at least one display module and at least one transparent lens;

detecting image data from a forward direction of a support frame, sensing signals for changes in motion, shape, or location of a user's hand or of a pointing tool;

detecting motion information of the user's hand or the pointing tool based on the signals and the image data;

modulating the AR content to correspond to the motion information by:

dividing the image data into block regions;

generating moving path data by connecting X-axis, Y-axis, and Z-axis coordinate information of the user's hand or the pointing tool in response to the user's hand or the pointing tool being detected from images of the block regions;

matching the X-axis, Y-axis, and Z-axis coordinate information of the user's hand or the pointing tool, comprised in the moving path data, and image objects of an image of the AR content; and modulating a general image of the AR content or display characteristic data of the image objects to correspond to changes in the X-axis, Y-axis, and Z-axis coordinate information of the user's hand or the pointing tool;

providing the AR content to the at least one display module; and transmitting the AR content to at least one external content display device.

17. The method of claim 16, wherein the detecting the user's hand or the pointing tool from the images of the block regions comprises detecting an image of the user's hand or the pointing tool based on at least one of a result of analyzing differences in grayscale or luminance between pixels of one of the block regions corresponding to the coordinates of the user's gaze direction and a result of analyzing pixel data of the one of the block regions corresponding to the coordinates of the user's gaze direction and a mask having the shape of the user's hand or the pointing tool.

18. The method of claim 17, wherein the generating the moving path data comprises generating the moving path data of the user's hand or the pointing tool by storing the X-axis, Y-axis, and Z-axis coordinate information of the user's hand or the pointing tool in coordinate space data or block data having a size of the AR content.

19. An electronic device including an apparatus for providing augmented reality (AR), the apparatus comprising:

a support frame supporting at least one transparent lens;

at least one display module for displaying AR content through the at least one transparent lens;

a sensing module assembled to, or integrally formed with, the support frame, for detecting image data from a forward direction of the support frame with a depth sensor or an image sensor, for sensing signals for changes in motion, shape, or a location of a user's hand or a location of a pointing tool with the depth sensor or the image sensor, and for detecting the user's eyeballs or pupils with a first biometric sensor or a second biometric sensor; and a control module for detecting motion information of the user's hand or of the pointing tool based on the signals and the image data, for modulating the AR content to correspond to the motion information, and for providing the modulated AR content to the at least one display module.

* * * * *